US012656589B2

(12) United States Patent
Tokunaga et al.

(10) Patent No.: US 12,656,589 B2
(45) Date of Patent: Jun. 16, 2026

(54) MICROSCOPE OBJECTIVE LENS AND MICROSCOPE APPARATUS

(71) Applicant: NIKON CORPORATION, Tokyo (JP)

(72) Inventors: Kyoya Tokunaga, Yokohama (JP); Kei Tomimatsu, Tokyo (JP); Katsuya Watanabe, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 384 days.

(21) Appl. No.: 18/030,398

(22) PCT Filed: Oct. 7, 2021

(86) PCT No.: PCT/JP2021/037160
§ 371 (c)(1),
(2) Date: Apr. 5, 2023

(87) PCT Pub. No.: WO2022/075410
PCT Pub. Date: Apr. 14, 2022

(65) Prior Publication Data
US 2023/0375818 A1    Nov. 23, 2023

(30) Foreign Application Priority Data
Oct. 8, 2020    (JP) ................................. 2020-170597

(51) Int. Cl.
*G02B 21/02*    (2006.01)
*G02B 13/00*    (2006.01)
(Continued)

(52) U.S. Cl.
CPC ......... *G02B 21/025* (2013.01); *G02B 13/006* (2013.01); *G02B 15/1421* (2019.08); *G02B 21/02* (2013.01); *G02B 21/361* (2013.01)

(58) Field of Classification Search
CPC ................ G02B 21/00; G02B 21/0004; G02B 21/0008; G02B 21/0012; G02B 21/0016;
(Continued)

(56) References Cited

U.S. PATENT DOCUMENTS 6,128,128 A * 10/2000 Otaki ...................... G02B 21/02
359/821
8,107,170 B2 * 1/2012 Fujiwara ................ A61B 1/002
359/659
(Continued)

FOREIGN PATENT DOCUMENTS

| JP | 2000-267000 | * | 9/2000 |
| JP | 2012-212128 A | | 11/2012 |
| JP | 2018-66912 A | | 4/2018 |

OTHER PUBLICATIONS

International Search Report, dated Dec. 28, 2021, in International Patent Application No. PCT/JP2021/037160 (4 pp.).
(Continued)

*Primary Examiner* — Thong Q Nguyen

(57) ABSTRACT
An infinity-corrected microscope objective lens has, arranged in order from the object side along an optical axis, a first lens group having a positive refractive power, and a second lens group having a positive refractive power, an intermediate image forming plane in which light from an object forms an image being positioned between the first lens group and the second lens group, and the microscope objective lens satisfying the condition below. $-0.2 < f \times NA/TL < -0.05$, where f is the focal length of the microscope objective lens, NA is the object-side numerical aperture of the microscope objective lens, and TL is the distance on the optical axis from the lens surface of the microscope objective lens on the side thereof closest to the object to the lens surface of the microscope objective lens on the side thereof closest to the image.

10 Claims, 16 Drawing Sheets

(51) Int. Cl.
    *G02B 15/14*       (2006.01)
    *G02B 21/36*       (2006.01)

(58) Field of Classification Search
    CPC .............. G02B 21/002; G02B 21/0026; G02B
              21/0032; G02B 21/0088; G02B 21/02;
                              G02B 21/025
    USPC .................................. 359/362–432, 656–661
    See application file for complete search history.

(56)                   References Cited

U.S. PATENT DOCUMENTS

| | | |
|---|---|---|
| 2012/0236399 A1 | 9/2012 | Hirata |
| 2018/0113293 A1 | 4/2018 | Abe et al. |

OTHER PUBLICATIONS

Written Opinion of the International Searching Authority dated Dec. 28, 2021 for International Application No. PCT/JP2021/037160.
Japanese Office Action dated Dec. 5, 2023 for counterpart Japanese Application No. 2022-555562.

\* cited by examiner

DISTORTION

IMG HT

CdFg 0.31

0.24

0.16

0.08

-5.0    -2.5    0.0    2.5    5.0

% DISTORTION

CURVATURE OF FIELD

IMG HT dCF g
C d    F    g 0.31

0.24

0.16

0.08

-1.0E-3    -5.0E-4    0.0    5.0E-4    1.0E-3

FOCUS (MILLIMETERS)

SPHERICAL ABERRATION d C F g
1.00

0.75

0.50

0.25

-1.0E-3    -5.0E-4    0.0    5.0E-4    1.0E-3

FOCUS (MILLIMETERS)

FIG.5

MERIDIONAL COMA ABERRATIONS

SAGITTAL COMA ABERRATIONS

RFH=1.00

RFH=0.50

RFH=0.00

MICROSCOPE OBJECTIVE LENS AND MICROSCOPE APPARATUS

CROSS REFERENCE TO RELATED APPLICATIONS

This application is a U.S. National Stage Application which claims the benefit under 35 U.S.C. § 371 of International Patent Application No. PCT/JP2021/037160 filed on Oct. 7, 2021, which claims priority benefit from Japanese Patent Application No. 2020-170597 filed on Oct. 8, 2020, the contents of each of which are incorporated herein by reference.

TECHNICAL FIELD

The present invention relates to a microscope objective lens and a microscope apparatus.

TECHNICAL BACKGROUND

In recent years, various large-aperture objective lenses for microscopes have been proposed (for example, see Patent literature 1). Such objective lenses are required to favorably correct aberrations while reducing the sizes of the objective lenses.

PRIOR ARTS LIST

Patent Document

Patent literature 1: Japanese Laid-Open Patent Publication No. 2018-66912(A)

SUMMARY OF THE INVENTION

A microscope objective lens according to the present invention is an infinity-corrected microscope objective lens converting light from an object into parallel light, comprising, in order from the object on an optical axis: a first lens group having a positive refractive power; and a second lens group having a positive refractive power, wherein an intermediate imaging plane on which an image is formed with the light from the object is formed between the first lens group and the second lens group or in a lens closest to an image in the first lens group, and the following conditional expression is satisfied, $$-0.2 < f \times NA/TL < -0.05$$

where f: a focal length of the microscope objective lens,
   NA: an object-side numerical aperture of the microscope objective lens, and
   TL: a distance on the optical axis from a most object-side lens surface of the microscope objective lens to a most image-side lens surface of the microscope objective lens.

A microscope apparatus according to the present invention is a microscope apparatus that comprises an infinity-corrected first microscope objective lens converting light from an object into parallel light, and an infinity-corrected second microscope objective lens converting light from the object into parallel light, and is capable of selecting and using the first microscope objective lens or the second microscope objective lens, wherein at least one of the first microscope objective lens and the second microscope objective lens is the microscope objective lens described above.

BRIEF DESCRIPTION OF THE DRAWINGS

FIG. 5 shows coma aberration graphs of the microscope objective lens according to First Example;

FIG. 9 is an optical path diagram showing a configuration of a microscope objective lens according to Third Example;

FIG. 12 is an optical path diagram showing a configuration of a microscope objective lens according to Fourth Example;

DESCRIPTION OF THE EMBODIMENTS

Hereinafter, a microscope objective lens and a microscope apparatus according to this embodiment are described with reference to the drawings. In this embodiment, the microscope objective lens that has a small diameter and can favorably correct aberrations, and the microscope apparatus that includes this lens are described.

Figure 1:
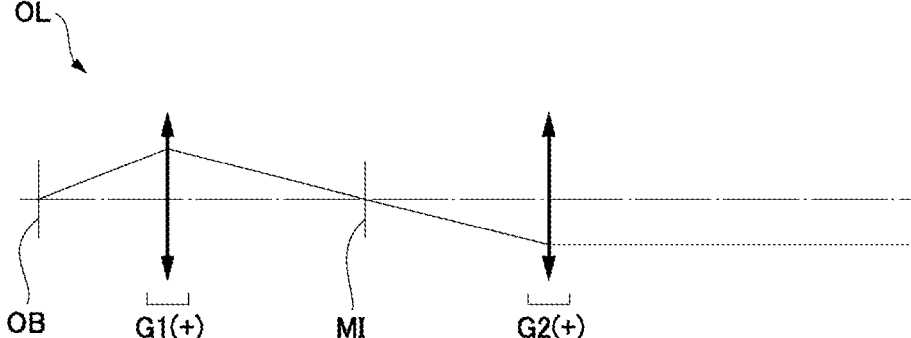
FIG. 1 is a schematic diagram of a main part of a microscope objective lens.

As shown in FIG. 1, the microscope objective lens OL according to this embodiment is an infinity-corrected microscope objective lens converting light from an object OB into parallel light. The microscope objective lens OL according to this embodiment comprises: in order from the object on an optical axis: a first lens group G1 having a positive refractive power; and a second lens group G2 having a positive refractive power. An intermediate imaging plane MI on which an image is formed with the light from the object OB is formed between the first lens group G1 and the second lens group G2 or in a lens closest to an image in the first lens group G1. Note that in FIG. 1 and the like, the object OB indicates an object surface.

The microscope objective lens OL according to this embodiment satisfies the following conditional expression (1).

$$-0.2 < f \times NA/TL < -0.05 \tag{1}$$

where f: a focal length of the microscope objective lens OL,

NA: an object-side numerical aperture of the microscope objective lens OL, and

TL: a distance on the optical axis from a most object-side lens surface of the microscope objective lens OL to a most image-side lens surface of the microscope objective lens OL.

According to this embodiment, the microscope objective lens capable of favorably correcting the aberrations even with a small diameter can be obtained. Specific examples of the microscope objective lens OL according to this embodiment may be the microscope objective lens OL(1) shown in FIG. 3, the microscope objective lens OL(2) shown in FIG. 6, the microscope objective lens OL(3) shown in FIG. 9, or the microscope objective lens OL(4) shown in FIG. 12.

The conditional expression (1) is a conditional expression that defines the relationship between the focal length of the microscope objective lens OL, the object-side numerical aperture of the microscope objective lens OL, and the distance on the optical axis from the most object-side lens surface of the microscope objective lens OL to the most image-side lens surface of the microscope objective lens OL. By satisfying the conditional expression (1), the object-side numerical aperture of the microscope objective lens OL can be made large, and the coma aberration in the peripheral region can be favorably corrected.

If the corresponding value of the conditional expression (1) exceeds the upper limit value, the focal length of the microscope objective lens OL is required to be short in order to increase the object numerical aperture while reducing the entire length of the microscope objective lens OL, and it is difficult to correct various aberrations, such as the coma aberration. To more securely achieve the advantageous effects of this embodiment, it is preferable that the upper limit value of the conditional expression (1) may be −0.06.

If the corresponding value of the conditional expression (1) falls below the lower limit value, the focal length of the microscope objective lens OL becomes too long even with an intention to increase the object numerical aperture while reducing the entire length of the microscope objective lens OL. Accordingly, it is difficult to correct the spherical aberration. To more securely achieve the advantageous effects of this embodiment, it is preferable that the lower limit value of the conditional expression (1) may be −0.17.

In the microscope objective lens OL according to this embodiment, the first lens group G1 may include at least one lens having a concave-shaped lens surface facing the intermediate imaging plane MI, and the following conditional expression (2) may be satisfied, $$0.1 < WD/r1 < 2.0 \tag{2}$$

where WD: a distance on the optical axis from an object surface (OB) to the most object-side lens surface of the microscope objective lens OL, and r1: a radius of curvature of the concave-shaped lens surface of the lens having a smallest radius of curvature of the concave-shaped lens surface, among the at least one lens of the first lens group G1.

The conditional expression (2) defines a conditional expression that defines the relationship between the distance on the optical axis from the object surface (OB) to the most object-side lens surface of the microscope objective lens OL, and the radius of curvature of the concave-shaped lens surface of the lens having the smallest radius of curvature of the concave-shaped lens surface among at least one lens of the first lens group G1. In this embodiment, the radius of curvature of the lens surface is assumed to have a positive value in a case of a convex lens surface facing the object. By satisfying the conditional expression (2), the object-side numerical aperture of the microscope objective lens OL can be made large, and the spherical aberration and the curvature of field can be favorably corrected.

If the corresponding value of the conditional expression (2) exceeds the upper limit value, the distance on the optical axis from the object surface (OB) to the most object-side lens surface of the microscope objective lens OL becomes too long with respect to the radius of curvature of the concave-shaped lens surface smallest in the first lens group G1. Accordingly, correction of the spherical aberration is insufficient. To more securely achieve the advantageous effects of this embodiment, it is preferable that the upper limit value of the conditional expression (2) may be 1.80.

If the corresponding value of the conditional expression (2) falls below the lower limit value, the radius of curvature of the concave-shaped lens surface smallest in the first lens group G1 becomes too large. Accordingly, correction of the curvature of field becomes insufficient. To more securely achieve the advantageous effects of this embodiment, it is preferable that the lower limit value of the conditional expression (2) may be 0.14.

The microscope objective lens OL according to this embodiment may satisfy the following conditional expression (3).

$$0.35 < L1/TL < 0.7 \tag{3}$$

where L1: a length of the first lens group G1 on the optical axis.

The conditional expression (3) is a conditional expression that defines the relationship between the length of the first lens group G1 on the optical axis, and the distance on the optical axis from the most object-side lens surface of the microscope objective lens OL to the most image-side lens surface of the microscope objective lens OL. By satisfying the conditional expression (3), various aberrations caused by a light beam passing through the edge of the entrance pupil (or the exit pupil) (i.e., the light beam corresponding to the large numerical aperture) can be favorably corrected.

If the corresponding value of the conditional expression (3) exceeds the upper limit value, the load on aberration correction in the second lens group G2 becomes large. Accordingly, it is difficult to correct the various aberrations caused by a light beam passing through the end of the entrance pupil (or the exit pupil).

If the corresponding value of the conditional expression (3) falls below the lower limit value, the load on aberration correction in the first lens group G1 becomes large. Accordingly, it is difficult to correct the various aberrations caused by a light beam passing through the end of the entrance pupil (or the exit pupil). To more securely achieve the advantageous effects of this embodiment, it is preferable that the lower limit value of the conditional expression (3) may be 0.45.

The microscope objective lens OL according to this embodiment may satisfy the following conditional expression (4).

$$0.12 < D1/TL < 0.3 \tag{4}$$

where D1: a maximum outer diameter of the first lens group G1.

The conditional expression (4) is a conditional expression that defines the relationship between the maximum outer diameter of the first lens group G1, and the distance on the optical axis from the most object-side lens surface of the microscope objective lens OL to the most image-side lens surface of the microscope objective lens OL. In this embodiment, the maximum outer diameter of the first lens group G1 indicates the maximum effective diameter among the effective diameters of the lenses constituting the first lens group G1. By satisfying the conditional expression (4), the object-side numerical aperture of the microscope objective lens OL can be made large, and the spherical aberration can be favorably corrected.

If the corresponding value of the conditional expression (4) exceeds the upper limit value, the maximum outer diameter of the first lens group G1 becomes too large and the height of the light beam becomes too high. Accordingly, correction of the various aberrations, such as the spherical aberration, becomes insufficient. To more securely achieve the advantageous effects of this embodiment, it is preferable that the upper limit value of the conditional expression (4) may be 0.26.

If the corresponding value of the conditional expression (4) falls below the lower limit value, correction of the spherical aberration becomes insufficient. To more securely achieve the advantageous effects of this embodiment, it is preferable that the lower limit value of the conditional expression (4) may be 0.13.

The microscope objective lens OL according to this embodiment may further comprise at least one cemented lens arranged in at least one of the first lens group G1 and the second lens group G2, wherein the following conditional expression (5) may be satisfied, $$vdif > 50 \qquad (5)$$

where vdif: a maximum value of a difference of Abbe numbers of lenses constituting the at least one cemented lens, in the cemented lens.

The conditional expression (5) is a conditional expression that defines an appropriate range of the maximum value of the difference of the Abbe numbers of the lenses constituting at least one cemented lens described above with respect to the cemented lens concerned. In this embodiment, in a case where the cemented lens is made up of two lenses, the difference between the Abbe numbers of the lenses constituting the cemented lens indicates the difference between the Abbe numbers of the two lenses. In a case where the cemented lens is made up of three or more lenses, the difference indicates the difference between the Abbe numbers of two lenses among the three or more lenses. By satisfying the conditional expression (5), the primary chromatic aberration can be favorably corrected.

If the corresponding value of the conditional expression (5) falls below the lower limit value, correction of the primary chromatic aberration becomes insufficient. To more securely achieve the advantageous effects of this embodiment, it is preferable that the lower limit value of the conditional expression (5) may be 60.

In the microscope objective lens OL according to this embodiment, the first lens group G1 may include at least one lens having a concave-shaped lens surface facing the intermediate imaging plane MI, the second lens group G2 may include at least one lens having a concave-shaped lens surface facing the intermediate imaging plane MI, and the following conditional expression (6) and (7) may be satisfied, $$0.01 < r1/(-f) < 1.0 \qquad (6)$$

$$0.01 < r2/f < 1.0 \qquad (7)$$

where r1: a radius of curvature of the concave-shaped lens surface of the lens having a smallest radius of curvature of the concave-shaped lens surface, among the at least one lens of the first lens group G1, and r2: a radius of curvature of the concave-shaped lens surface of the lens having a smallest radius of curvature of the concave-shaped lens surface, among the at least one lens of the second lens group G2.

The conditional expression (6) defines a conditional expression that defines the relationship between the radius of curvature of the concave-shaped lens surface of the lens having the smallest radius of curvature of the concave-shaped lens surface among at least one lens of the first lens group G1, and the focal length of the microscope objective lens OL. By satisfying the conditional expression (6), the curvature of field can be favorably corrected.

If the corresponding value of the conditional expression (6) exceeds the upper limit value, the radius of curvature of the concave-shaped lens surface smallest in the first lens group G1 becomes too large. Accordingly, correction of the curvature of field becomes insufficient. To more securely achieve the advantageous effects of this embodiment, it is preferable that the upper limit value of the conditional expression (6) may be 0.60.

If the corresponding value of the conditional expression (6) falls below the lower limit value, the radius of curvature of the concave-shaped lens surface smallest in the first lens group G1 becomes too small. Accordingly, the magnification of the relay system is required to be small in order to correct the spherical aberration occurring on the intermediate imaging plane MI, and correction of various aberrations, such as the curvature of field, becomes insufficient. To more securely achieve the advantageous effects of this embodiment, it is preferable that the lower limit value of the conditional expression (6) may be 0.015.

The conditional expression (7) defines a conditional expression that defines the relationship between the radius of curvature of the concave-shaped lens surface of the lens having the smallest radius of curvature (absolute value) of the concave-shaped lens surface among at least one lens of the second lens group G2, and the focal length of the microscope objective lens OL. By satisfying the conditional expression (7), the curvature of field can be favorably corrected.

If the corresponding value of the conditional expression (7) exceeds the upper limit value, the radius of curvature (absolute value) of the concave-shaped lens surface smallest in the second lens group G2 becomes too large. Accordingly, correction of the curvature of field becomes insufficient. To more securely achieve the advantageous effects of this embodiment, it is preferable that the upper limit value of the conditional expression (7) may be 0.50.

If the corresponding value of the conditional expression (7) falls below the lower limit value, the radius of curvature (absolute value) of the concave-shaped lens surface smallest in the second lens group G2 becomes too small. Accordingly, the magnification of the relay system is required to be small in order to correct the spherical aberration occurring on the intermediate imaging plane MI, and correction of various aberrations, such as the curvature of field, becomes insufficient. To more securely achieve the advantageous effects of this embodiment, it is preferable that the lower limit value of the conditional expression (7) may be 0.02.

The microscope objective lens OL according to this embodiment may satisfy the following conditional expression (8).

$$0.2 < D1/D2 < 2.0 \qquad (8)$$

where D1: a maximum outer diameter of the first lens group G1, and

D2: a maximum outer diameter of the second lens group G2.

The conditional expression (8) defines a conditional expression that defines the relationship between the maximum outer diameter of the first lens group G1, and the maximum outer diameter of the second lens group G2. In this embodiment, the maximum outer diameter of the second lens group G2 indicates the maximum effective diameter among the effective diameters of the lenses constituting the second lens group G2. By satisfying the conditional expression (8), the entire length of the microscope objective lens OL can be made small, and various aberrations, such as the spherical aberration, can be favorably corrected.

If the corresponding value of the conditional expression (8) exceeds the upper limit value, the maximum outer diameter of the first lens group G1 becomes too large with respect to the maximum outer diameter of the second lens group G2. Accordingly, it is difficult to correct the various aberrations of the second lens group G2. To more securely achieve the advantageous effects of this embodiment, it is preferable that the upper limit value of the conditional expression (8) may be 1.70.

If the corresponding value of the conditional expression (8) falls below the lower limit value, the maximum outer diameter of the first lens group G1 becomes too small with respect to the maximum outer diameter of the second lens group G2. Accordingly, correction of the spherical aberration caused by a light beam passing through the end of the entrance pupil (or the exit pupil) (i.e., the light beam corresponding to the large numerical aperture) becomes insufficient. To more securely achieve the advantageous effects of this embodiment, it is preferable that the lower limit value of the conditional expression (8) may be 0.50.

Figure 2:
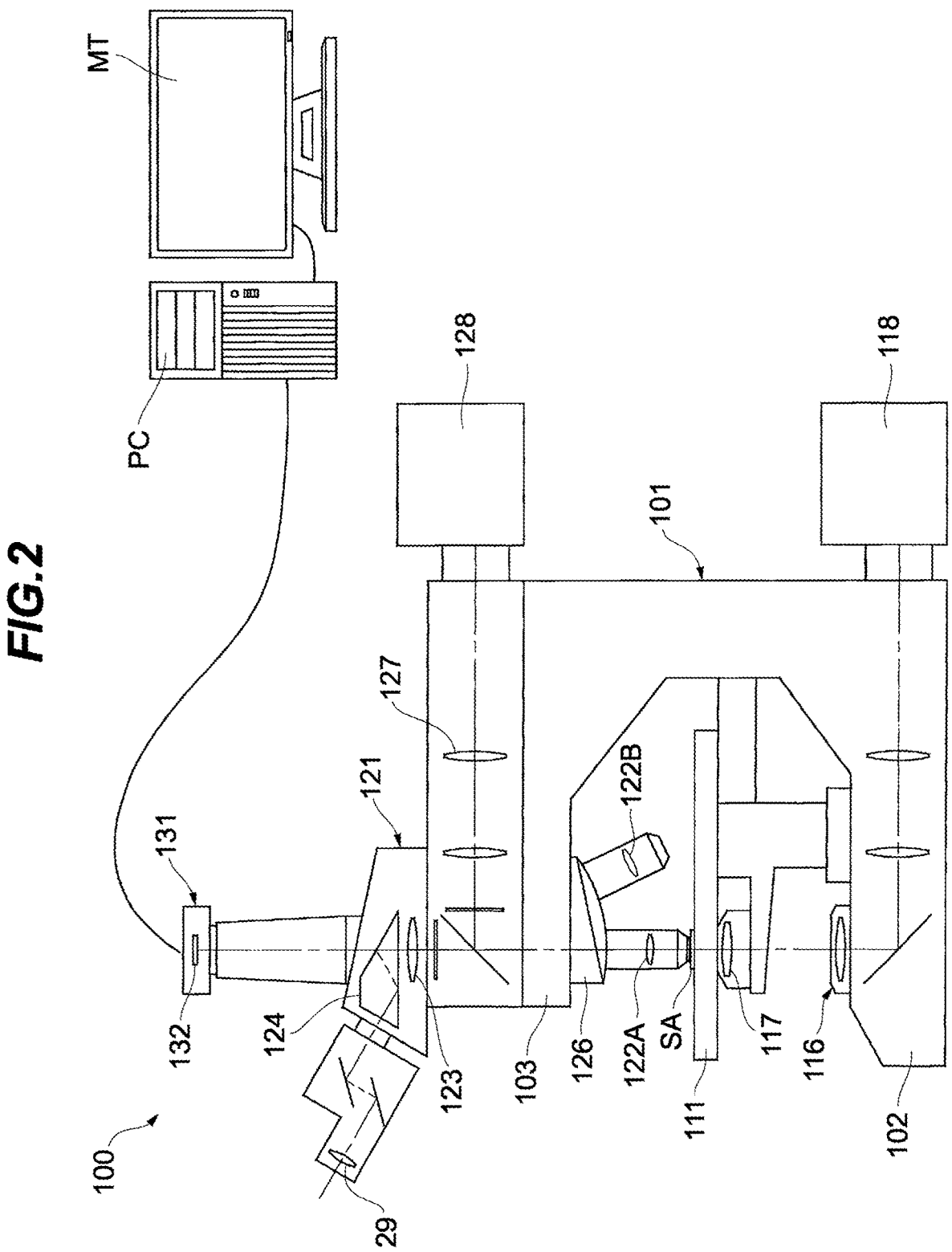
FIG. 2 is a schematic configuration diagram showing an immersion microscope that is an example of a microscope apparatus.

Next, a microscope apparatus according to this embodiment is described. As an example of the microscope apparatus, an immersion microscope 100 is described with reference to FIG. 2. The immersion microscope 100 includes a stand 101, a stage 111 attached to a base 102 of the stand 101, a lens barrel 121 attached to an arm 103 of the stand 101, and an image pickup unit 131 coupled to the lens barrel 121. For example, a sample SA held between a glass slide (not shown) and a cover glass (not shown) is mounted on the stage 111. Alternatively, a sample SA contained with immersion liquid in a sample container (not shown) may be mounted on the stage 111. A condenser lens 117 that constitutes a transmitted illumination device 116 is attached below the stage 111. Besides the stage 111, the transmitted illumination device 116 described above, a transmitted illumination light source 118 and the like are attached to the base 102 of the stand 101.

A first objective lens 122A and a second objective lens 122B are attached to a revolver 126 provided below the lens barrel 121. In the case where the sample SA held between the glass slide (not shown) and the cover glass (not shown) is mounted on the stage 111, the gap between the distal end of the first objective lens 122A (or the second objective lens 122B) and the cover glass is filled with the immersion liquid. In the case where the sample SA contained with immersion liquid in the container (not shown) is mounted on the stage 111, the gap between the distal end of the first objective lens 122A (or the second objective lens 122B) and the sample SA in the sample container is filled with the immersion liquid. The microscope objective lens OL according to this embodiment is used as the first objective lens 122A and the second objective lens 122B attached to the revolver 126. An imaging lens 123 and a prism 124 are provided in the lens barrel 121. Note that an incident-light fluorescence device 127 and an incident-light fluorescence light source 128, an eyepiece 129 and the like are attached to the lens barrel 121. An image-pickup element 132 is provided in the image pickup unit 131.

In such an immersion microscope 100, the first objective lens 122A and the second objective lens 122B can be selected by rotating the revolver 126 and used. The example in FIG. 2 indicates a case where the revolver 126 is rotated and the first objective lens 122A is selected. Light from the sample SA passes through the first objective lens 122A (or the second objective lens 122B), the imaging lens 123 and the prism 124, and reaches the image-pickup element 132. An image of the sample SA is formed by the imaging lens 123 on an image pickup plane of the image-pickup element 132, and the image-pickup element 132 takes the image of the sample SA. An image of the sample SA picked up and taken by the image-pickup element 132 is displayed on a monitor MT through an external computer PC. The external computer PC can apply various types of image processing to image data on the sample SA picked up and obtained by the image-pickup element 132. According to such a configuration, the microscope objective lens OL according to the aforementioned embodiment that has a small diameter but can favorably correct aberrations is mounted, which can achieve the microscope that has a large aperture and favorably corrected aberrations without increasing the size of the revolver 126.

In the immersion microscope 100 described above, the microscope objective lens OL according to this embodiment is used as the first objective lens 122A and the second objective lens 122B attached to the revolver 126. However, there is no limitation to this. For example, only the first objective lens 122A may be the microscope objective lens OL according to this embodiment. Only the second objective lens 122B may be the microscope objective lens OL according to this embodiment. That is, at least one of the first objective lens 122A and the second objective lens 122B is only required to be the microscope objective lens OL according to this embodiment.

In the immersion microscope 100 described above, the first objective lens 122A and the second objective lens 122B are attached to the revolver 126. However, there is no limitation to this. A third objective lens (not shown) may further be attached. In this case, the third objective lens may be the microscope objective lens OL according to this embodiment, or is not necessarily the microscope objective lens OL according to this embodiment.

The immersion microscope 100 has been described as an example of the microscope apparatus according to this embodiment. However, there is no limitation to this. For example, the microscope apparatus according to this embodiment may be a microscope apparatus that uses no immersion liquid and adopts air as a medium between the distal end of the first objective lens 122A (or the second objective lens 122B) and the sample SA. The immersion microscope 100 may be an upright microscope or an inverted microscope.

EXAMPLES

Hereinafter, Examples of the microscope objective lens OL according to the present embodiment are described with reference to the drawings. FIGS. 3, 6, 9 and 12 are optical path diagrams showing configurations of microscope objective lenses OL {OL(1) to OL(4)} according to First to Fourth Examples. In FIGS. 3, 6, 9 and 12, each lens group is represented by a combination of a symbol G and a numeral (or an alphabet), and each lens is represented by a combination of a symbol L and a numeral (or an alphabet). In this case, to prevent complication due to increase in the types and numbers of symbols and numerals, the lenses and the like are represented using the combinations of symbols and numerals independently for each Example. Accordingly, even when the same combination of a symbol and a numeral is used among Examples, such use does not necessarily mean the same configuration.

Tables 1 to 4 are hereinafter shown. Among these tables, Table 1 is a table showing each data item in First Example, Table 2 is that in Second Example, Table 3 is that in Third Example, and Table 4 is that in Fourth Example. In each Example, for calculation of aberration characteristics, d-line (wavelength $\lambda$=587.6 nm), g-line (wavelength $\lambda$=435.8 nm), C-line (wavelength $\lambda$=656.3 nm) and F-line (wavelength $\lambda$=486.1 nm) are selected.

In the table of [General Data], $\beta$ indicates the magnification of the microscope objective lens. f indicates the focal length of the microscope objective lens. NA indicates the object-side numerical aperture of the microscope objective lens. WD indicates the distance on the optical axis from the object surface to the most object-side lens surface of the microscope objective lens, and f1 indicates the focal length of the first lens group. f2 indicates the focal length of the second lens group. r1 indicates the radius of curvature of the concave-shaped lens surface of the lens having the smallest radius of curvature of the concave-shaped lens surface, among at least one lens having a concave-shaped lens surface facing the intermediate imaging plane in the first lens group. r2 indicates the radius of curvature of the concave-shaped lens surface of the lens having the smallest radius of curvature of the concave-shaped lens surface, among the at least one lens having a concave-shaped lens surface facing the intermediate imaging plane in the second lens group. D1 indicates the maximum outer diameter of the first lens group. D2 indicates the maximum outer diameter of the second lens group. L1 indicates the length of the first lens group on the optical axis. TL indicates the distance on the optical axis from the most object-side lens surface of the microscope objective lens to the most image-side lens surface of the microscope objective lens. TLT indicates the distance on the optical axis from the object surface to the most image-side lens surface of the microscope objective lens.

In the table of [Lens Data], the surface number indicates the order of the lens surface from the object side, R indicates the radius of curvature corresponding to each surface number (in a case of lens surface having a convex surface facing the object, the value is assumed to be positive), D is the lens thickness or the air distance on the optical axis corresponding to each surface number, Dm indicates an effective diameter corresponding to the surface number, nd indicates the refractive index of the optical material for d-line (wavelength $\lambda$=587.6 nm) corresponding to each surface number, and vd indicates the Abbe number corresponding to each surface number with reference to d-line. "$\infty$" of the radius of curvature indicates a plane or an opening. The description of the air refractive index nd=1.00000 is omitted.

The table of [Variable Distance Data] in Fourth Example shows the surface distance at the surface number i where the surface distance is (Di) in the table of [Lens Data]. In the table of [Variable Distance Data], ndim indicates the refractive index of the immersion liquid for d-line indicated as (Variable) in the table of [Lens Data]. vdim indicates the Abbe number of the immersion liquid with reference to d-line indicated as (Variable) in the table of [Lens Data]. In the table of [Variable Distance Data], "Oil" indicates a case where the immersion liquid is oil, and "Silicone Oil" indicates a case where the immersion liquid is silicone oil.

Hereinafter, at all the data values, the listed focal length f, radius of curvature R, surface distance D, other lengths and the like are generally represented in "mm" if not otherwise specified. However, even after subjected to proportional scaling in or out, the optical system can achieve equivalent optical performances. Accordingly, the representation is not limited to this example.

The descriptions of the tables so far are common to all the Examples. Redundant descriptions are hereinafter omitted.

First Example

Figure 3:
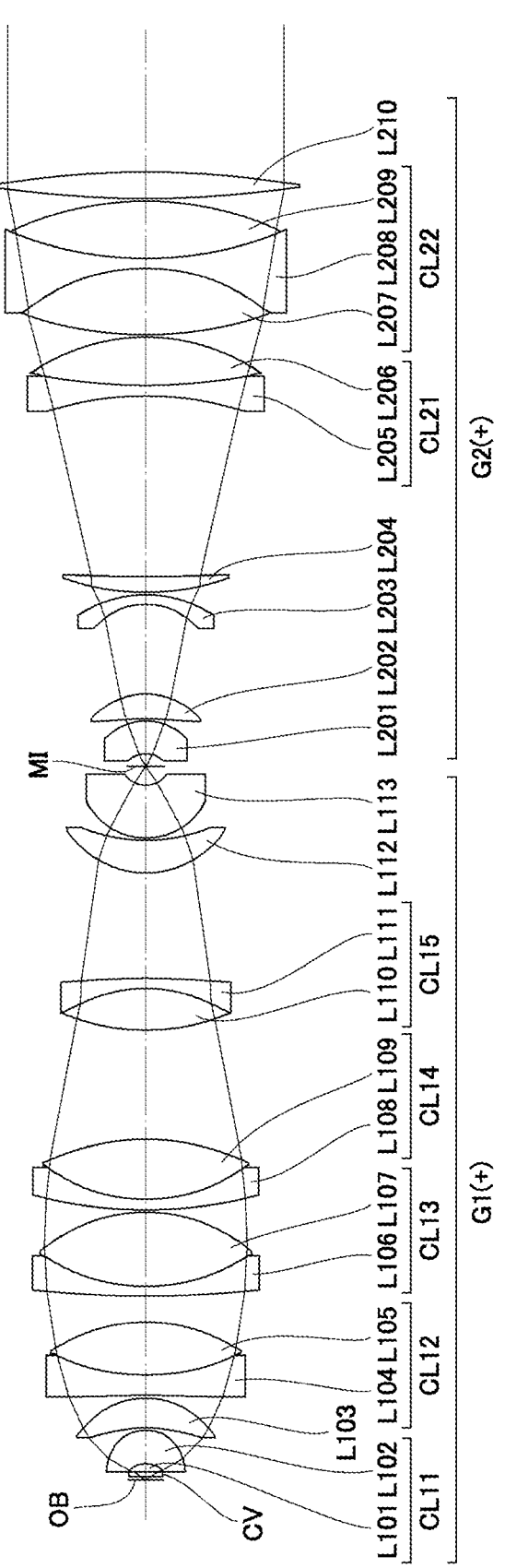
FIG. 3 is an optical path diagram showing a configuration of a microscope objective lens according to First Example.

First Example is described with reference to FIGS. 3 to 5 and Table 1. FIG. 3 is an optical path diagram showing the configuration of a microscope objective lens according to First Example. The microscope objective lens OL(1) according to First Example is an infinity-corrected microscope objective lens converting light from an object OB into parallel light. The microscope objective lens OL(1) according to First Example comprises: in order from the object on an optical axis: a first lens group G1 having a positive refractive power; and a second lens group G2 having a positive refractive power. Between the first lens group G1 and the second lens group G2, an intermediate imaging plane MI on which light from the object OB is formed is formed. The gap between the distal end of the microscope objective lens OL(1) according to First Example and a cover glass CV covering the object OB is filled with the immersion liquid (oil). The gap between the cover glass CV and the object OB is also filled with the immersion liquid (oil). Note that the refractive index of the immersion liquid for d-line (wavelength $\lambda$=587.6 nm) is assumed as 1.515. The refractive index of the cover glass CV for d-line is assumed as 1.524.

The first lens group G1 comprises, in order from the object on the optical axis: a first cemented lens CL11 that includes a plano-convex positive lens L101 having a planar surface facing the object, and a negative meniscus lens L102 having a concave surface facing the object, which are cemented to each other; a positive meniscus lens L103 having a concave surface facing the object; a second cemented lens CL12 that includes a biconcave negative lens L104, and a biconvex positive lens L105, which are cemented to each other; a third cemented lens CL13 that includes a negative meniscus lens L106 having a convex surface facing the object, and a biconvex positive lens L107, which are cemented to each other; a fourth cemented lens CL14 that includes a negative meniscus lens L108 having a convex surface facing the object, and a biconvex positive lens L109, which are cemented to each other; a fifth cemented lens CL15 that includes a biconvex positive lens L110, and a negative meniscus lens L111 having a concave surface facing the object, which are cemented to each other; a positive meniscus lens L112 having a convex surface facing the object; and a negative meniscus lens L113 having a convex surface facing the object. The positive meniscus lens L112 and the negative meniscus lens L113 correspond to the lens having a concave-shaped lens surface facing the intermediate imaging plane MI in this embodiment.

The second lens group G2 comprises, in order from the object on the optical axis: a negative meniscus lens L201 having a concave surface facing the object; a positive meniscus lens L202 having a concave surface facing the object; a negative meniscus lens L203 having a concave surface facing the object; a positive meniscus lens L204 having a convex surface facing the object; a first cemented lens CL21 that includes a biconcave negative lens L205, and a biconvex positive lens L206, which are cemented to each other; a second cemented lens CL22 that includes a biconvex positive lens L207, a biconcave negative lens L208, and a biconvex positive lens L209, which are cemented to each other; and a biconvex positive lens L210. The negative meniscus lens L201, the positive meniscus lens L202, the negative meniscus lens L203, and the negative lens L205 of the first cemented lens CL21 correspond to the lens having a concave-shaped lens surface facing the intermediate imaging plane MI in this embodiment.

In the microscope objective lens OL(1) according to First Example, the first lens group G1 includes a negative meniscus lens L113 that is arranged closest to the image in the first lens group G1 and has a concave surface facing the image, and the second lens group G2 includes a negative meniscus lens L201 that is arranged closest to the object in the second lens group G2 and has a concave surface facing the object. A boundary is provided and the intermediate imaging plane MI is formed between an image-side concave surface of the negative meniscus lens L113 of the first lens group G1 and an object-side concave surface of the negative meniscus lens L201 of the second lens group G2 that are arranged to face each other with an air distance intervening between the surfaces.

The following Table 1 lists values of data on the microscope objective lens according to First Example. Note that the first surface is an object surface (OB). The intermediate imaging plane MI is at a position from the 24-th surface toward the image by 1.083 [mm].

TABLE 1

[General Data]

| β = 40times | |
| --- | --- |
| f = −7.605 | |
| NA = 1.40 | WD = 0.305 |
| f1 = 7.430 | f2 = 13.302 |
| r1 = 1.357 | r2 = −1.456 |
| D1 = 10.739 | D2 = 14.363 |
| L1 = 34.174 | TL = 64.695 |
| TLT = 65.000 | |

[Lens Data]

| Surface Number | R | D | Dm | nd | vd |
| --- | --- | --- | --- | --- | --- |
| 1 | ∞ | 0.100 | 0.000 | 1.515 | 41.33 |
| 2 | ∞ | 0.170 | 0.986 | 1.524 | 54.24 |
| 3 | ∞ | 0.035 | 1.576 | 1.515 | 41.33 |
| 4 | ∞ | 0.400 | 1.701 | 1.540 | 59.46 |
| 5 | −1.381 | 1.699 | 1.850 | 2.001 | 29.12 |
| 6 | −2.000 | 0.100 | 3.821 | | |
| 7 | −8.911 | 1.474 | 5.828 | 1.595 | 67.73 |
| 8 | −4.263 | 0.123 | 6.487 | | |
| 9 | −122.669 | 1.024 | 8.044 | 1.613 | 44.46 |
| 10 | 11.397 | 2.620 | 9.313 | 1.595 | 67.73 |
| 11 | −9.265 | 1.303 | 9.510 | | |
| 12 | 53.956 | 0.500 | 10.436 | 1.738 | 32.26 |
| 13 | 9.999 | 3.715 | 10.613 | 1.434 | 95.16 |
| 14 | −8.572 | 0.100 | 10.739 | | |
| 15 | 23.544 | 0.500 | 10.587 | 1.757 | 47.82 |
| 16 | 8.893 | 3.013 | 10.236 | 1.434 | 95.16 |
| 17 | −12.565 | 5.419 | 10.244 | | |
| 18 | 11.764 | 2.080 | 8.052 | 1.439 | 94.94 |
| 19 | −7.901 | 0.500 | 7.939 | 1.917 | 31.60 |
| 20 | −53.268 | 5.224 | 7.978 | | |

TABLE 1-continued

| 21 | 4.909 | 1.664 | 7.374 | 2.001 | 25.46 |
| --- | --- | --- | --- | --- | --- |
| 22 | 9.316 | 0.100 | 6.724 | | |
| 23 | 3.502 | 2.617 | 5.573 | 2.001 | 29.12 |
| 24 | 1.357 | 1.582 | 2.184 | | |
| 25 | −1.456 | 1.646 | 1.878 | 2.001 | 29.12 |
| 26 | −2.844 | 0.100 | 3.824 | | |
| 27 | −16.538 | 1.222 | 4.709 | 1.849 | 43.79 |
| 28 | −3.819 | 4.476 | 5.053 | | |
| 29 | −3.563 | 0.502 | 5.417 | 1.923 | 18.90 |
| 30 | −6.255 | 0.100 | 6.329 | | |
| 31 | 13.239 | 0.770 | 7.701 | 1.923 | 18.90 |
| 32 | 74.777 | 8.972 | 7.732 | | |
| 33 | −17.359 | 0.533 | 10.201 | 1.734 | 51.51 |
| 34 | 29.196 | 2.413 | 10.991 | 1.439 | 94.94 |
| 35 | −10.601 | 0.100 | 11.177 | | |
| 36 | 19.614 | 3.302 | 12.189 | 1.434 | 95.16 |
| 37 | −10.180 | 0.500 | 12.206 | 1.673 | 38.26 |
| 38 | 18.802 | 2.893 | 13.142 | 1.439 | 94.94 |
| 39 | −16.351 | 0.100 | 13.271 | | |
| 40 | 53.358 | 1.312 | 14.306 | 1.664 | 27.35 |
| 41 | −48.931 | 10.000 | 14.363 | | |

Figure 4:
FIG. 4 shows various aberration graphs of the microscope objective lens according to First Example.
Figure 5:
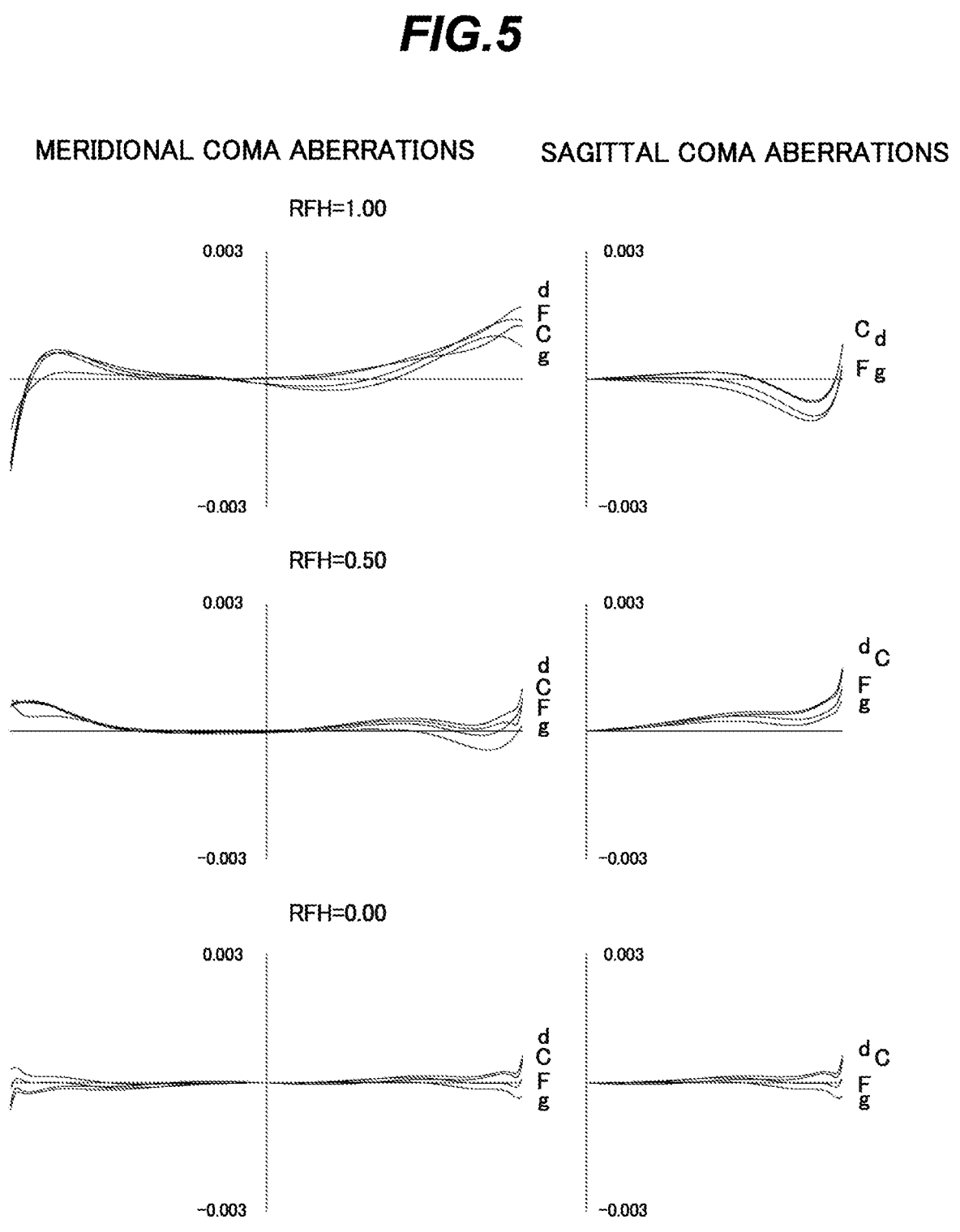

FIG. 4 shows various aberrations (the spherical aberration, curvature of field, and distortion) of the microscope objective lens according to First Example. FIG. 5 shows coma aberrations (meridional and sagittal coma aberrations) of the microscope objective lens according to First Example. Note that each aberration graph indicates various aberrations obtained by reverse ray tracing with a light beam from an infinity object on the image side. In the aberration graphs in FIGS. 4 and 5, d indicates various aberrations for d-line (wavelength $\lambda$=587.6 nm), g indicates those for g-line (wavelength $\lambda$=435.8 nm), C indicates those for C-line (wavelength $\lambda$=656.3 nm), and F indicates those for F-line (wavelength $\lambda$=486.1 nm). In the spherical aberration graph, the ordinate axis indicates the value normalized with the maximum value of the entrance pupil radius being adopted as one, and the abscissa axis indicates the value [mm] of the aberration for each light beam. In the aberration graph showing the curvature of field, solid lines indicate the meridional image surfaces for the respective wavelengths, and broken lines indicate the sagittal image surfaces for the respective wavelengths. In the aberration graph showing the curvature of field, the ordinate axis indicates the image height [mm], and the abscissa axis indicates the value of aberration [mm]. In the distortion graph (distortion), the ordinate axis indicates the image height [mm], and the abscissa axis indicates the rate of the aberration by the percentage (% value). Each coma aberration graph indicates the value of aberration with the relative field height (RFH) ranging from 0.00 to 1.00. Also in the aberration graphs in the following Examples, symbols similar to those in this Example are used, and redundant description is omitted.

Each aberration graph shows that the microscope objective lens according to First Example has various aberrations favorably corrected even with a small diameter, and has an excellent imaging performance.

Second Example

Figure 6:
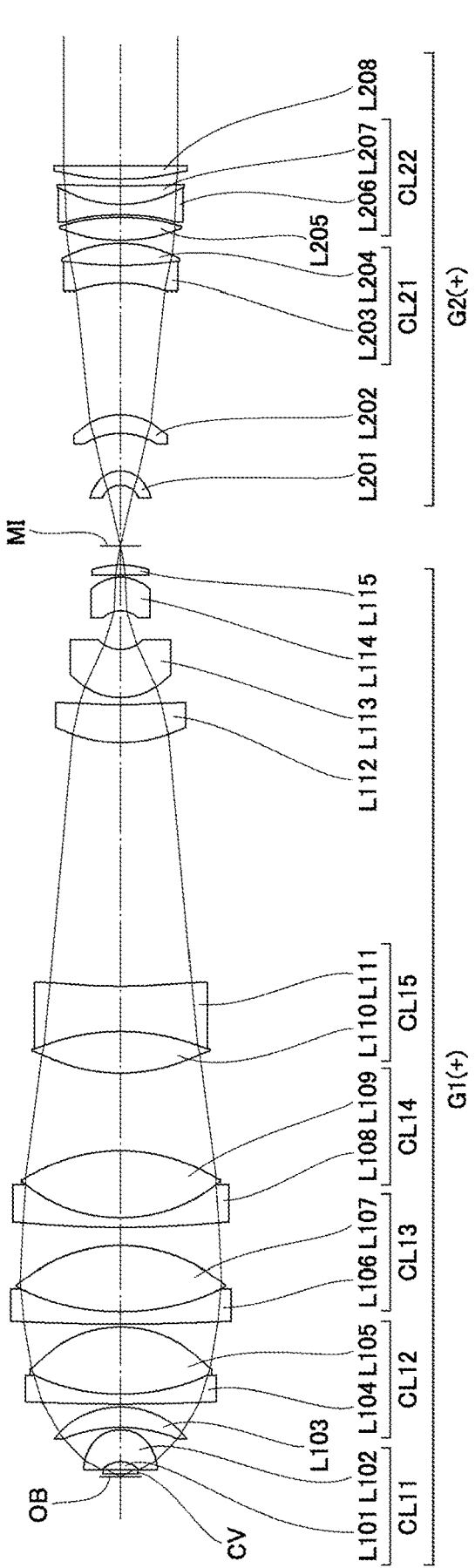
FIG. 6 is an optical path diagram showing a configuration of a microscope objective lens according to Second Example.

Second Example is described with reference to FIGS. 6 to 8 and Table 2. FIG. 6 is an optical path diagram showing the configuration of a microscope objective lens according to Second Example. The microscope objective lens OL(2) according to Second Example is an infinity-corrected microscope objective lens converting light from an object OB into parallel light. The microscope objective lens OL(2) according to Second Example comprises: in order from the object on an optical axis: a first lens group G1 having a positive refractive power; and a second lens group G2 having a positive refractive power. Between the first lens group G1 and the second lens group G2, an intermediate imaging plane MI on which light from the object OB is formed is formed. The gap between the distal end of the microscope objective lens OL(2) according to Second Example and a cover glass CV covering the object OB is filled with the immersion liquid (oil). The gap between the cover glass CV and the object OB is also filled with the immersion liquid (oil). Note that the refractive index of the immersion liquid for d-line (wavelength λ=587.6 nm) is assumed as 1.515. The refractive index of the cover glass CV for d-line is assumed as 1.524.

The first lens group G1 comprises, in order from the object on the optical axis: a first cemented lens CL11 that includes a plano-convex positive lens L101 having a planar surface facing the object, and a negative meniscus lens L102 having a concave surface facing the object, which are cemented to each other; a positive meniscus lens L103 having a concave surface facing the object; second cemented lens CL12 that includes a negative meniscus lens L104 having a convex surface facing the object, and a biconvex positive lens L105, which are cemented to each other; a third cemented lens CL13 that includes a negative meniscus lens L106 having a convex surface facing the object, and a biconvex positive lens L107, which are cemented to each other; a fourth cemented lens CL14 that includes a negative meniscus lens L108 having a convex surface facing the object, and a biconvex positive lens L109, which are cemented to each other; a fifth cemented lens CL15 that includes a biconvex positive lens L110, and a biconcave negative lens L111, which are cemented to each other; a positive meniscus lens L112 having a convex surface facing the object; a negative meniscus lens L113 having a convex surface facing the object; a negative meniscus lens L114 having a concave surface facing the object; and a biconvex positive lens L115. The negative lens L111 of the fifth cemented lens CL15, the positive meniscus lens L112, and the negative meniscus lens L113 correspond to the lens having a concave-shaped lens surface facing the intermediate imaging plane MI in this embodiment.

The second lens group G2 comprises, in order from the object on the optical axis: a negative meniscus lens L201 having a concave surface facing the object; a positive meniscus lens L202 having a concave surface facing the object; a first cemented lens CL21 that includes a biconcave negative lens L203, and a biconvex positive lens L204, which are cemented to each other; a biconvex positive lens L205; a second cemented lens CL22 that includes a biconcave negative lens L206, and a positive meniscus lens L207 having a convex surface facing the object, which are cemented to each other; and a positive meniscus lens L208 having a convex surface facing the object. The negative meniscus lens L201, the positive meniscus lens L202, the negative lens L203 of the first cemented lens CL21, and the negative lens L206 of the second cemented lens CL22 correspond to the lens having a concave-shaped lens surface facing the intermediate imaging plane MI in this embodiment.

In the microscope objective lens OL(2) according to Second Example, the first lens group G1 includes a positive lens L115 arranged closest to the image in the first lens group G1, and the second lens group G2 includes a negative meniscus lens L201 that is arranged closest to the object in the second lens group G2 and has a concave surface facing the object. A boundary is provided and the intermediate imaging plane MI is formed between the positive lens L115 of the first lens group G1, and the negative meniscus lens L201 of the second lens group G2 that are arranged with an air distance intervening between the lenses.

The following Table 2 lists values of data on the microscope objective lens according to Second Example. Note that the first surface is an object surface (OB). An intermediate imaging plane MI is at a position from the 29-th surface toward the image by 0.927 [mm].

TABLE 2

| [General Data] | | | |
|---|---|---|---|
| β = 100times | | | |
| f = −3.042 | | | |
| NA = 1.45 | | WD = 0.305 | |
| f1 = −1.554 | | f2 = 14.473 | |
| r1 = 1.606 | | r2 = −1.057 | |
| D1 = 10.313 | | D2 = 6.131 | |
| L1 = 44.934 | | TL = 64.695 | |
| TLT = 65.000 | | | |

| [Lens Data] | | | | | |
|---|---|---|---|---|---|
| Surface Number | R | D | Dm | nd | vd |
| 1 | ∞ | 0.100 | 0.000 | 1.515 | 41.33 |
| 2 | ∞ | 0.170 | 0.652 | 1.524 | 54.24 |
| 3 | ∞ | 0.035 | 1.601 | 1.515 | 41.33 |
| 4 | ∞ | 0.400 | 1.818 | 1.540 | 59.46 |
| 5 | −1.387 | 1.596 | 1.912 | 2.001 | 29.12 |
| 6 | −1.869 | 0.100 | 3.676 | | |
| 7 | −7.768 | 1.060 | 5.814 | 1.595 | 67.73 |
| 8 | −4.354 | 0.100 | 6.254 | | |
| 9 | 84.740 | 0.500 | 8.032 | 1.613 | 44.46 |
| 10 | 11.198 | 3.331 | 8.837 | 1.434 | 95.16 |
| 11 | −5.936 | 0.102 | 9.097 | | |
| 12 | 84.368 | 0.615 | 9.939 | 1.720 | 34.71 |
| 13 | 11.607 | 3.323 | 10.192 | 1.434 | 95.16 |
| 14 | −8.130 | 0.877 | 10.313 | | |
| 15 | 53.055 | 0.501 | 10.012 | 1.757 | 47.82 |
| 16 | 7.990 | 3.316 | 9.744 | 1.434 | 95.16 |
| 17 | −9.510 | 3.876 | 9.798 | | |
| 18 | 9.422 | 2.089 | 8.249 | 1.498 | 82.57 |
| 19 | −11.572 | 2.210 | 8.054 | 1.917 | 31.60 |
| 20 | 33.927 | 12.083 | 7.475 | | |
| 21 | 7.655 | 1.871 | 6.012 | 1.893 | 20.36 |
| 22 | 29.921 | 0.364 | 5.402 | | |
| 23 | 3.515 | 2.388 | 4.631 | 1.902 | 25.26 |
| 24 | 1.606 | 1.973 | 2.323 | | |
| 25 | −1.280 | 1.650 | 1.785 | 1.834 | 37.18 |
| 26 | −2.193 | 0.104 | 2.714 | | |
| 27 | 60.427 | 0.504 | 2.633 | 1.741 | 52.64 |
| 28 | −4.561 | 3.928 | 2.604 | | |
| 29 | −1.057 | 0.705 | 1.955 | 1.959 | 17.47 |
| 30 | −1.553 | 1.874 | 2.791 | | |
| 31 | −3.559 | 0.942 | 3.777 | 1.850 | 27.03 |
| 32 | −3.203 | 6.500 | 4.298 | | |
| 33 | −7.095 | 0.865 | 4.747 | 1.917 | 31.60 |
| 34 | 20.915 | 1.145 | 5.277 | 1.658 | 50.83 |
| 35 | −5.852 | 0.110 | 5.424 | | |
| 36 | 8.451 | 1.181 | 5.572 | 1.439 | 94.94 |
| 37 | −9.747 | 0.100 | 5.586 | | |
| 38 | −10.022 | 0.500 | 5.564 | 1.731 | 40.51 |
| 39 | 6.449 | 0.929 | 5.770 | 1.595 | 67.73 |
| 40 | 81.334 | 0.363 | 5.840 | | |
| 41 | 14.172 | 0.620 | 6.112 | 1.667 | 48.33 |
| 42 | 364.344 | 10.000 | 6.131 | | |

Figure 7:
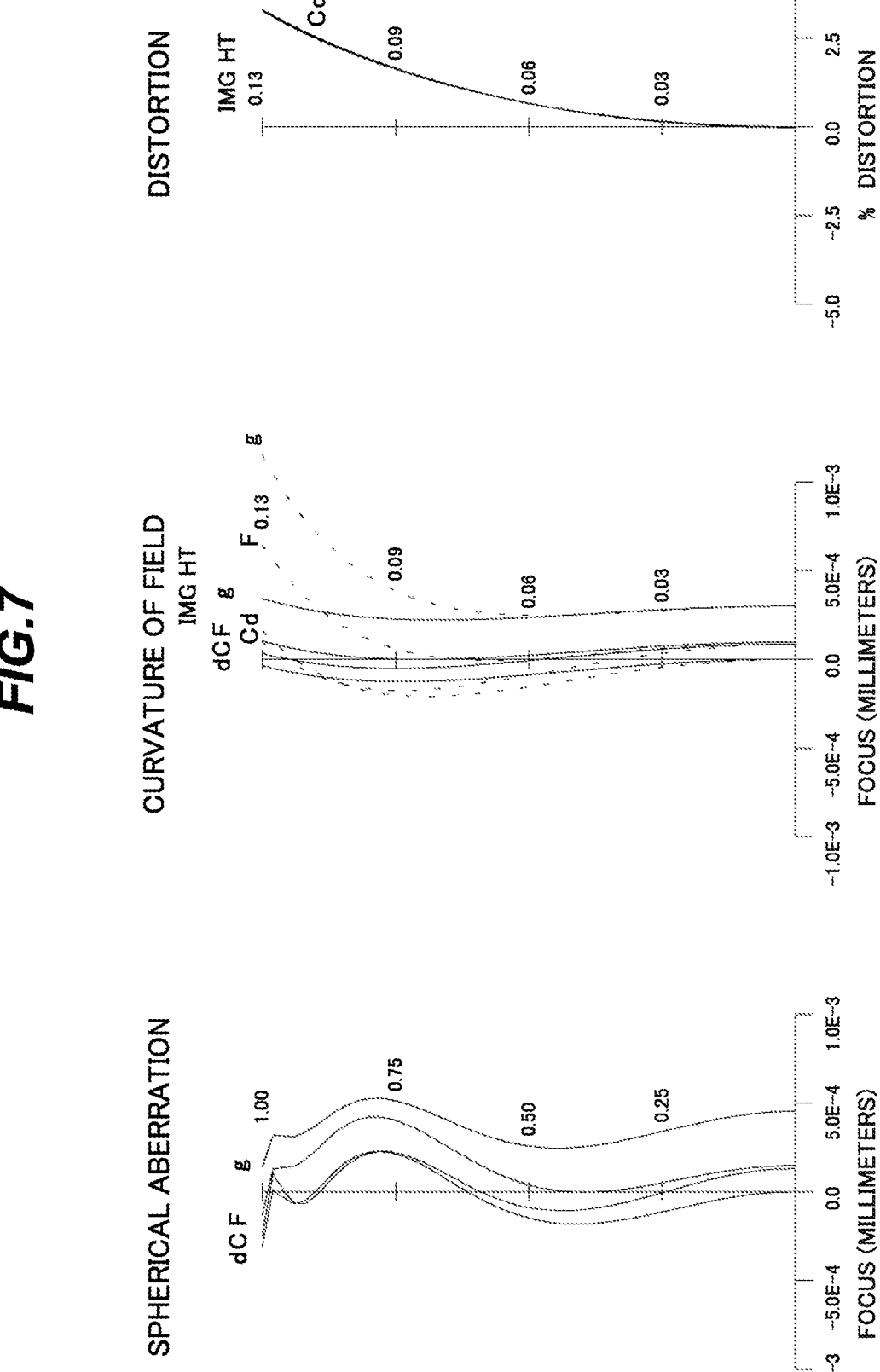
FIG. 7 shows various aberration graphs of the microscope objective lens according to Second Example.
Figure 8:
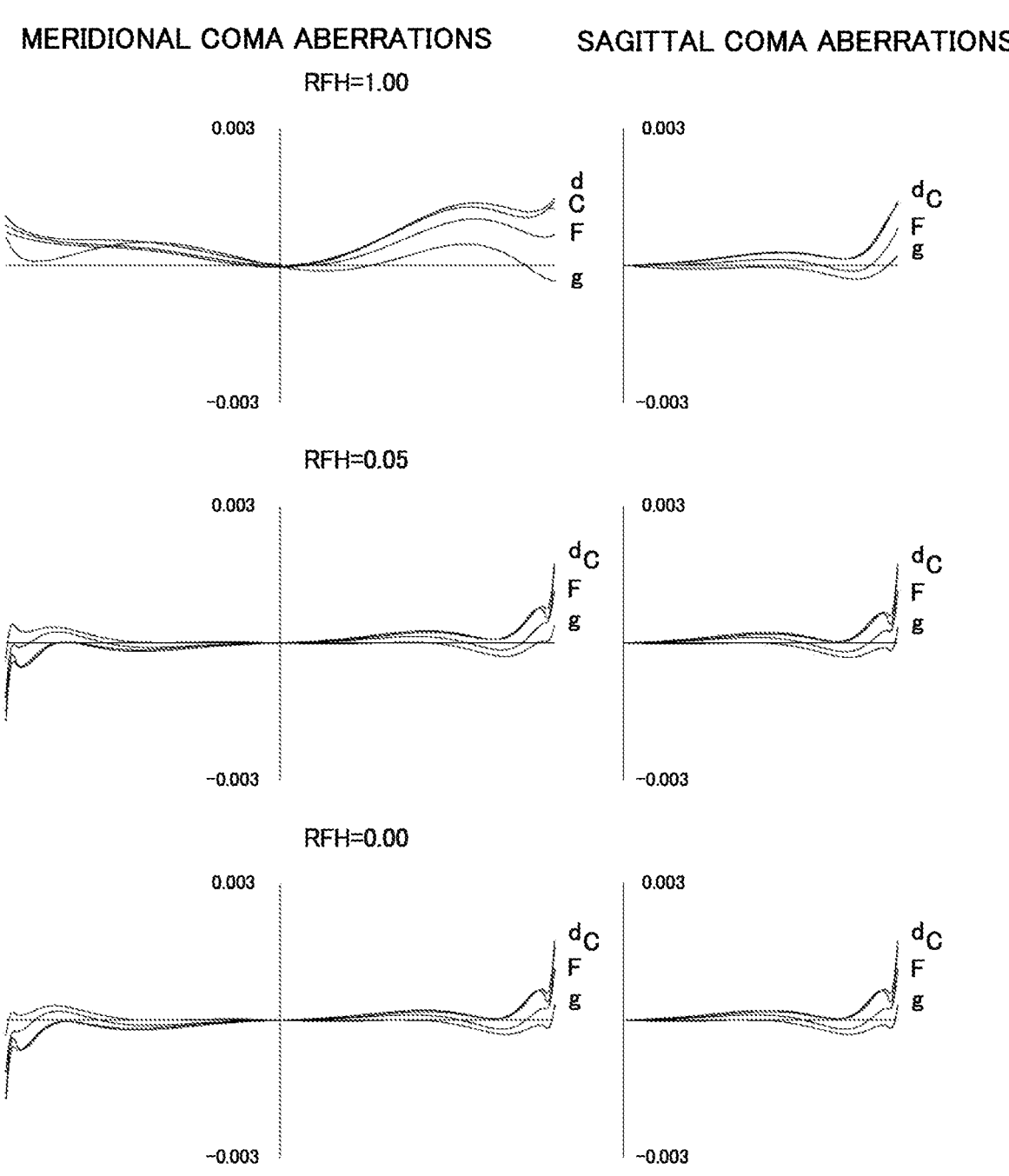
FIG. 8 shows coma aberration graphs of the microscope objective lens according to Second Example.

FIG. 7 shows various aberrations (the spherical aberration, curvature of field, and distortion) of the microscope objective lens according to Second Example. FIG. 8 shows coma aberrations (meridional and sagittal coma aberrations) of the microscope objective lens according to Second Example. Each aberration graph shows that the microscope objective lens according to Second Example has various aberrations favorably corrected even with a small diameter, and has an excellent imaging performance.

Third Example

Figure 9:
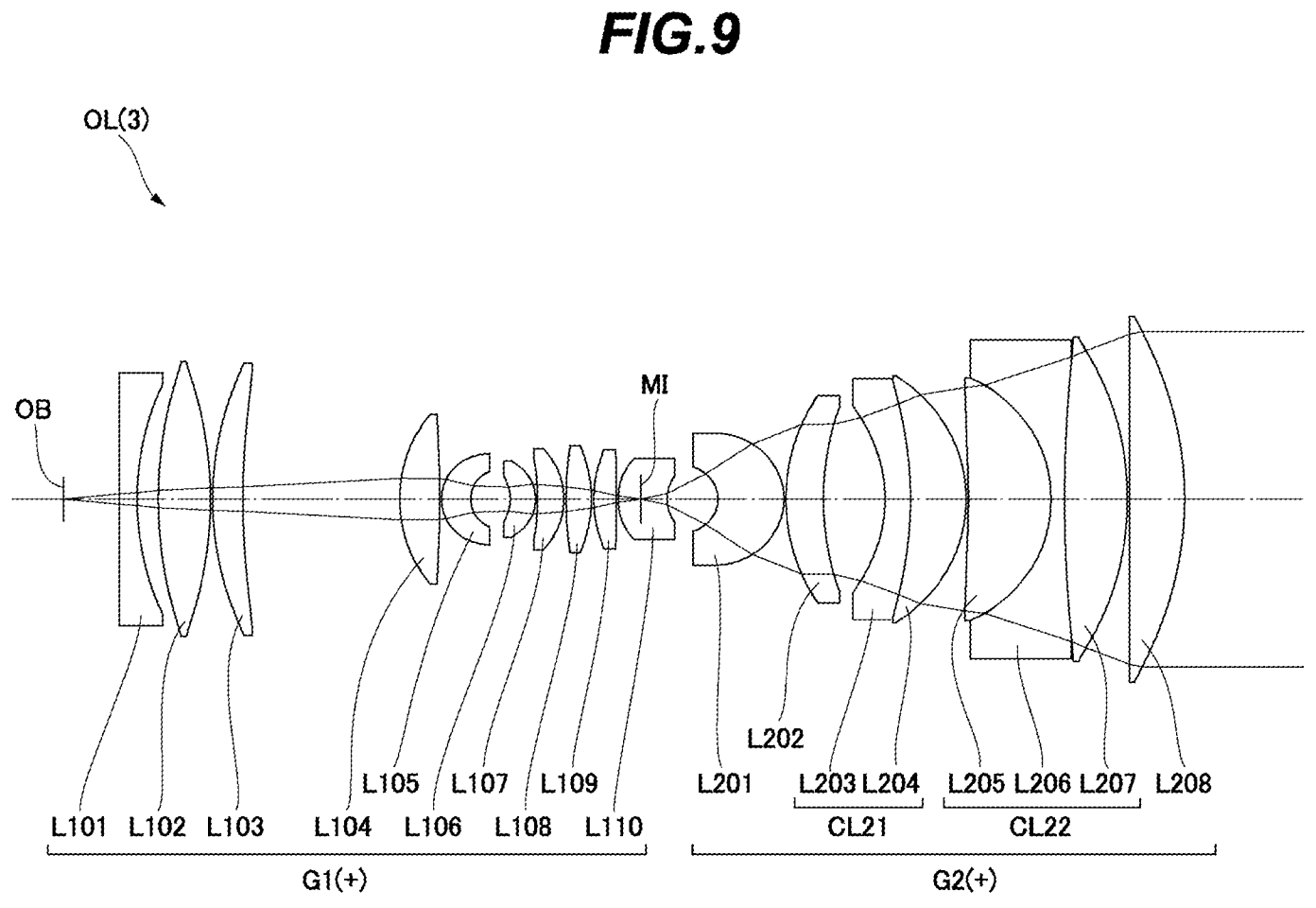

Third Example is described with reference to FIGS. 9 to 11 and Table 3. FIG. 9 is an optical path diagram showing the configuration of a microscope objective lens according to Third Example. The microscope objective lens OL(3) according to Third Example is an infinity-corrected micro- scope objective lens converting light from an object OB into parallel light. The microscope objective lens OL(3) accord- ing to Third Example comprises: in order from the object on an optical axis: a first lens group G1 having a positive refractive power; and a second lens group G2 having a positive refractive power. An intermediate imaging plane MI on which an image is formed with the light from the object OB is formed in a most image-side lens (a negative meniscus lens L110 described later) of the first lens group G1. The gap between the distal end of the microscope objective lens OL(3) according to Third Example and the object OB is filled with air.

The first lens group G1 comprises, in order from the object on the optical axis: a plano-concave negative lens L101 having a planar surface facing the object; a biconvex positive lens L102; a positive meniscus lens L103 having a convex surface facing the object; a biconvex positive lens L104; a negative meniscus lens L105 having a convex surface facing the object; a positive meniscus lens L106 having a concave surface facing the object; a positive meniscus lens L107 having a concave surface facing the object; a biconvex positive lens L108; a biconvex positive lens L109; and a negative meniscus lens L110 having a convex surface facing the object. The negative lens L101, the positive meniscus lens L103 and the negative meniscus lens L105 correspond to the lens having a concave-shaped lens surface facing the intermediate imaging plane MI in this embodiment.

The second lens group G2 comprises, in order from the object on the optical axis: a negative meniscus lens L201 having a concave surface facing the object; a positive meniscus lens L202 having a convex surface facing the object; a first cemented lens CL21 that includes a negative meniscus lens L203 having a concave surface facing the object, and a positive meniscus lens L204 having a concave surface facing the object, which are cemented to each other; a second cemented lens CL22 that includes a positive meniscus lens L205 having a concave surface facing the object, a biconcave negative lens L206, and a biconvex positive lens L207, which are cemented to each other; and a positive meniscus lens L208 having a concave surface facing the object. The negative meniscus lens L201, the negative meniscus lens L203 of the first cemented lens CL21, the positive meniscus lens L205 of the second cemented lens CL22, and the positive meniscus lens L208 correspond to the lens having a concave-shaped lens surface facing the intermediate imaging plane MI in this embodi- ment.

In the microscope objective lens OL(3) according to Third Example, the first lens group G1 includes a negative menis- cus lens L110 that is arranged closest to the image in the first lens group G1 and has a convex surface facing the object, and the second lens group G2 includes a negative meniscus lens L201 that is arranged closest to the object in the second lens group G2 and has a convex surface facing the image. The intermediate imaging plane MI is formed in the negative meniscus lens L110 arranged closest to the image in the first lens group G1. Note that with certain aberration correction balance between the first lens group G1 and the second lens group G2, the intermediate imaging plane MI can be formed in the negative meniscus lens L201 disposed closest to the object in the second lens group G2. Consequently, a con- figuration can be adopted where the intermediate imaging plane is formed in any one of the meniscus lens that is disposed closest to the image in the first lens group and has a convex surface facing the object, and the meniscus lens that is disposed closest to the object in the second lens group and has a convex surface facing the image.

The following Table 3 lists values of data on the micro- scope objective lens according to Third Example. Note that the first surface is an object surface (OB). An intermediate imaging plane MI is at a position from the 19-th surface toward the image by 1.277 [mm].

TABLE 3

| [General Data] | | | | | |
|---|---|---|---|---|---|
| β = 2times | | | | | |
| f = −100.000 | | | | | |
| NA = 0.10 | | | WD = 3.391 | | |
| f1 = −69.007 | | | f2 = 35.307 | | |
| r1 = 1.942 | | | r2 = −2.077 | | |
| D1 = 15.101 | | | D2 = 20.044 | | |
| L1 = 29.042 | | | TL = 62.279 | | |
| TLT = 65.670 | | | | | |

| [Lens Data] | | | | | |
|---|---|---|---|---|---|
| Surface Number | R | D | Dm | nd | vd |
| 1 | ∞ | 3.391 | 0.000 | | |
| 2 | ∞ | 1.000 | 13.567 | 1.755 | 27.51 |
| 3 | 16.500 | 1.284 | 13.888 | | |
| 4 | 26.964 | 3.053 | 14.890 | 1.861 | 37.10 |
| 5 | −24.265 | 0.100 | 15.101 | | |
| 6 | 19.374 | 1.773 | 14.917 | 1.861 | 37.10 |
| 7 | 51.391 | 9.171 | 14.587 | | |
| 8 | 8.391 | 2.321 | 9.313 | 1.498 | 82.57 |
| 9 | −85.753 | 0.100 | 8.694 | | |
| 10 | 2.793 | 1.730 | 5.433 | 1.883 | 40.76 |
| 11 | 1.942 | 2.299 | 3.478 | | |
| 12 | −2.801 | 1.486 | 2.946 | 1.883 | 40.76 |
| 13 | −2.621 | 0.100 | 4.240 | | |
| 14 | −14.658 | 1.564 | 5.055 | 1.569 | 71.34 |
| 15 | −4.451 | 0.100 | 5.582 | | |
| 16 | 23.958 | 1.490 | 5.815 | 1.498 | 82.57 |
| 17 | −8.600 | 0.100 | 5.848 | | |
| 18 | 7.302 | 1.371 | 5.492 | 1.498 | 82.57 |
| 19 | −94.513 | 0.100 | 5.115 | | |
| 20 | 3.751 | 2.878 | 4.500 | 1.883 | 40.76 |
| 21 | 2.404 | 2.986 | 2.822 | | |
| 22 | −2.077 | 3.848 | 3.971 | 1.498 | 82.57 |
| 23 | −3.982 | 0.100 | 7.870 | | |
| 24 | 11.320 | 2.210 | 11.347 | 1.738 | 32.33 |
| 25 | 16.759 | 3.626 | 11.106 | | |
| 26 | −9.461 | 1.488 | 11.320 | 1.738 | 32.33 |
| 27 | −25.301 | 3.279 | 13.182 | 1.498 | 82.57 |
| 28 | −8.784 | 0.100 | 13.807 | | |
| 29 | −125.539 | 4.852 | 14.079 | 1.434 | 95.25 |
| 30 | −8.016 | 0.800 | 14.153 | 1.738 | 32.33 |
| 31 | 91.448 | 3.682 | 17.448 | 1.434 | 95.25 |
| 32 | −17.827 | 0.100 | 17.732 | | |
| 33 | −14867.000 | 3.188 | 19.758 | 1.762 | 26.52 |
| 34 | −22.197 | 10.000 | 20.044 | | |

Figure 10:
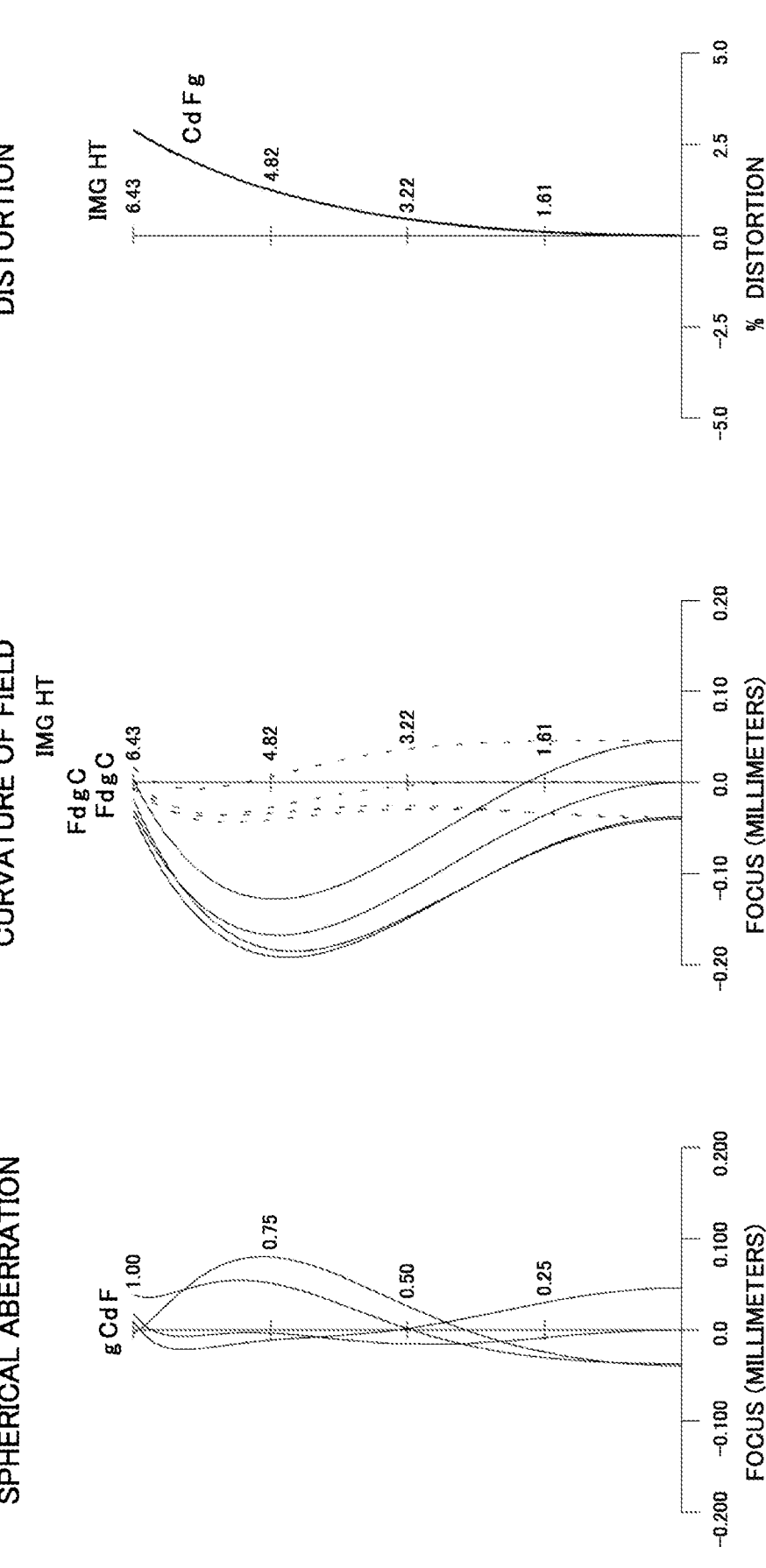
FIG. 10 shows various aberration graphs of the microscope objective lens according to Third Example.
Figure 11:
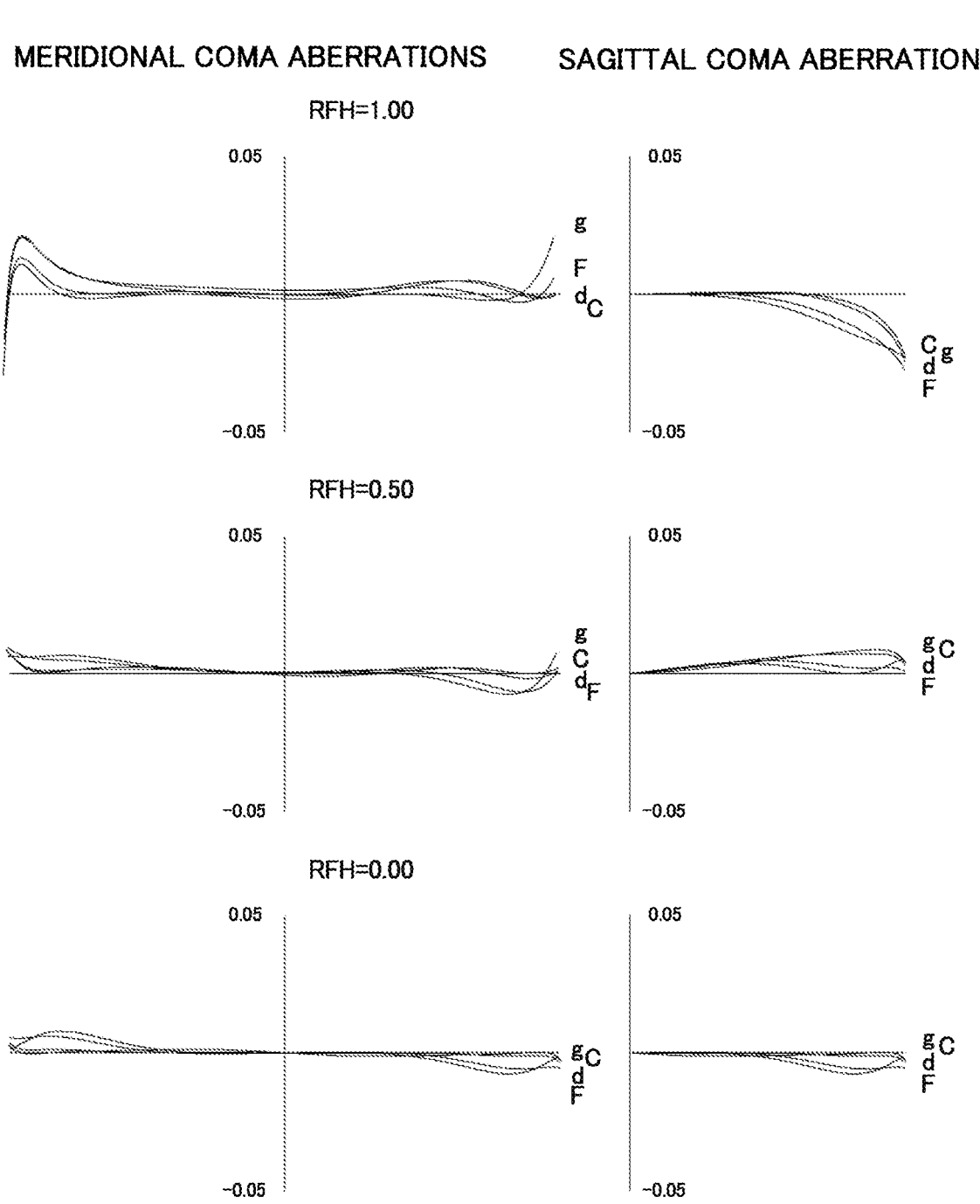
FIG. 11 shows coma aberration graphs of the microscope objective lens according to Third Example.

FIG. 10 shows various aberrations (the spherical aberra- tion, curvature of field, and distortion) of the microscope objective lens according to Third Example. FIG. 11 shows coma aberrations (meridional and sagittal coma aberrations) of the microscope objective lens according to Third Example. Each aberration graph shows that the microscope objective lens according to Third Example has various aberrations favorably corrected even with a small diameter, and has an excellent imaging performance.

Fourth Example

Figure 12:
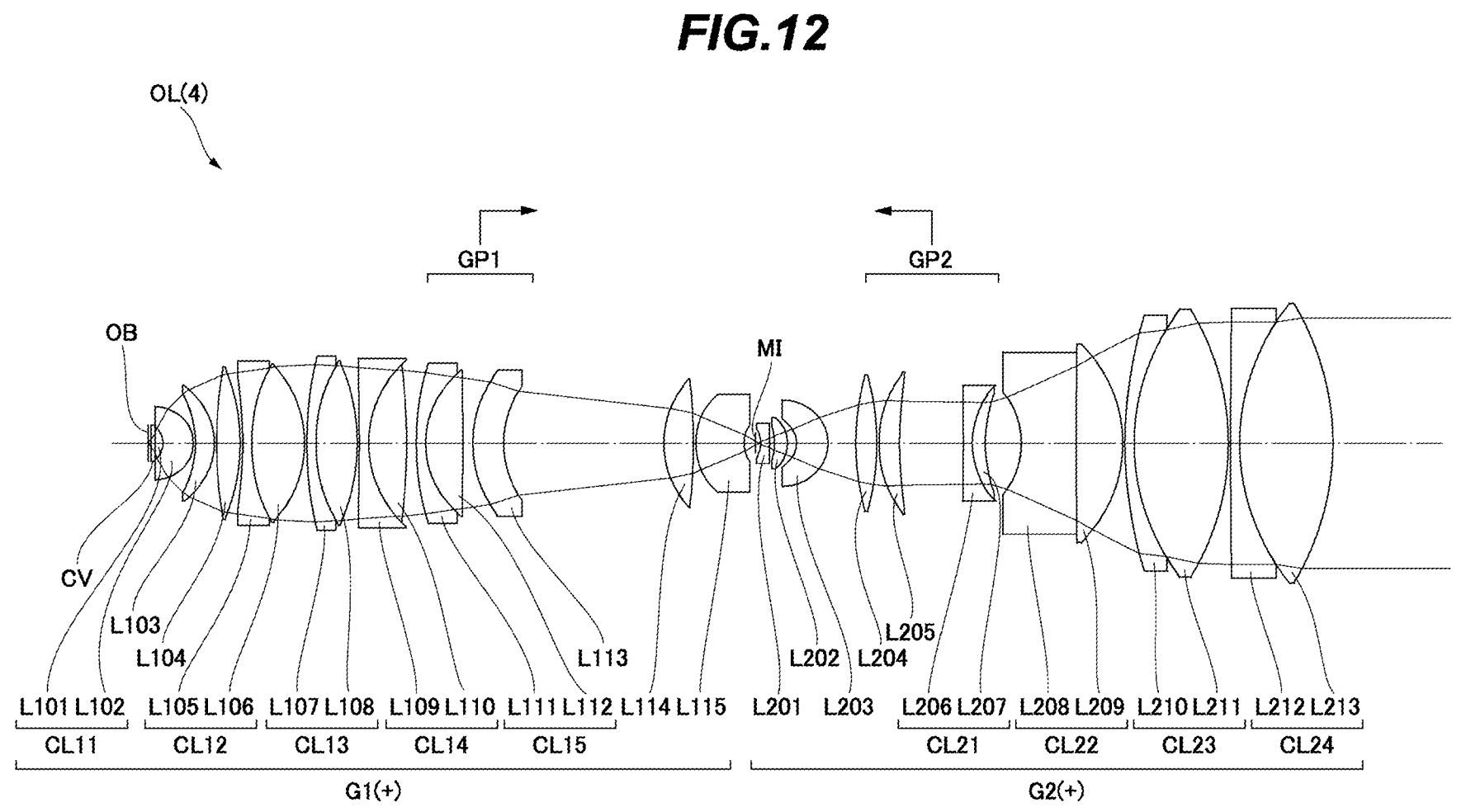

Fourth Example is described with reference to FIGS. 12 to 16 and Table 4. FIG. 12 is an optical path diagram showing the configuration of a microscope objective lens according to Fourth Example. The microscope objective lens OL(4) according to Fourth Example is an infinity-corrected microscope objective lens converting light from an object OB into parallel light. The microscope objective lens OL(4) according to Fourth Example comprises: in order from the object on an optical axis: a first lens group G1 having a positive refractive power; and a second lens group G2 having a positive refractive power. Between the first lens group G1 and the second lens group G2, an intermediate imaging plane MI on which light from the object OB is formed is formed. The gap between the distal end of the microscope objective lens OL(4) according to Fourth Example and a cover glass CV covering the object OB is filled with immersion liquid (oil or silicone oil). The gap between the cover glass CV and the object OB is also filled with the immersion liquid (oil or silicone oil). In the case where the immersion liquid is oil, the refractive index of the immersion liquid for d-line (wavelength λ=587.6 nm) is assumed as 1.51. In the case where the immersion liquid is silicone oil, the refractive index of the immersion liquid for d-line is assumed as 1.40. The refractive index of the cover glass CV for d-line is assumed as 1.524. FIG. 12 shows the microscope objective lens OL(4) according to Fourth Example in a case where the refractive index of the immersion liquid is 1.51.

The first lens group G1 comprises, in order from the object on the optical axis: a first cemented lens CL11 that includes a plano-convex positive lens L101 having a planar surface facing the object, and a negative meniscus lens L102 having a concave surface facing the object, which are cemented to each other; a positive meniscus lens L103 having a concave surface facing the object; a biconvex positive lens L104; a second cemented lens CL12 that includes a biconcave negative lens L105, and a biconvex positive lens L106, which are cemented to each other; a third cemented lens CL13 that includes a negative meniscus lens L107 having a convex surface facing the object, and a biconvex positive lens L108, which are cemented to each other; a fourth cemented lens CL14 that includes a biconcave negative lens L109, and a biconvex positive lens L110, which are cemented to each other; a fifth cemented lens CL15 that includes a negative meniscus lens L111 having a convex surface facing the object, and a biconvex positive lens L112, which are cemented to each other; a negative meniscus lens L113 having a convex surface facing the object; a biconvex positive lens L114; and a negative meniscus lens L115 having a convex surface facing the object. The negative meniscus lens L113 and the negative meniscus lens L115 correspond to the lens having a concave-shaped lens surface facing the intermediate imaging plane MI in this embodiment.

The second lens group G2 comprises, in order from the object on the optical axis: a negative meniscus lens L201 having a concave surface facing the object; a positive meniscus lens L202 having a concave surface facing the object; a negative meniscus lens L203 having a concave surface facing the object; a biconvex positive lens L204; a positive meniscus lens L205 having a convex surface facing the object; a first cemented lens CL21 including a biconcave negative lens L206, and a positive meniscus lens L207 having a convex surface facing the object, which are cemented to each other; a second cemented lens CL22 that includes a biconcave negative lens L208, and a biconvex positive lens L209, which are cemented to each other; a third cemented lens CL23 that includes a negative meniscus lens L210 having a convex surface facing the object, and a biconvex positive lens L211, which are cemented to each other; and a fourth cemented lens CL24 that includes a negative meniscus lens L212 having a convex surface facing the object, and a biconvex positive lens L213, which are cemented to each other. The negative meniscus lens L201, the positive meniscus lens L202, the negative meniscus lens L203, the negative lens L206 of the first cemented lens CL21, and the negative lens L208 of the second cemented lens CL22 correspond to the lens having a concave-shaped lens surface facing the intermediate imaging plane MI in this embodiment.

In the microscope objective lens OL(4) according to Fourth Example, the first lens group G1 includes a negative meniscus lens L115 that is arranged closest to the image in the first lens group G1 and has a concave surface facing the image, and the second lens group G2 includes a negative meniscus lens L201 that is arranged closest to the object in the second lens group G2 and has a concave surface facing the object. A boundary is provided and the intermediate imaging plane MI is formed between an image-side concave surface of the negative meniscus lens L115 of the first lens group G1 and an object-side concave surface of the negative meniscus lens L201 of the second lens group G2 that are arranged to face each other with an air distance intervening between the surfaces.

The first lens group G1 further includes a first correction group GP1 that is movable on the optical axis. The second lens group G2 further includes a second correction group GP2 that is movable on the optical axis. The first correction group GP1 and the second correction group GP2 function as what is called a correction ring through movement on the optical axis, and can correct the aberrations varying in accordance with the refractive index of the immersion liquid.

The first correction group GP1 is made up of the negative meniscus lens L111 and the positive lens L112 of the fifth cemented lens CL15, and the negative meniscus lens L113 in the first lens group G1. The first correction group GP1 moves toward the image on the optical axis when the type of the immersion liquid is changed from the oil to the silicone oil (i.e., when the refractive index of the immersion liquid is changed from a relatively high refractive index to a relatively low refractive index).

The second correction group GP2 is made up of the positive lens L204, the positive meniscus lens L205, and the negative lens L206 and the positive meniscus lens L207 of the first cemented lens CL21 in the second lens group G2. The second correction group GP2 moves toward the object on the optical axis when the type of the immersion liquid is changed from the oil to the silicone oil (i.e., when the refractive index of the immersion liquid is changed from a relatively high refractive index to a relatively low refractive index).

The following Table 4 lists values of data on the microscope objective lens according to Fourth Example. Note that the first surface is an object surface (OB). The intermediate imaging plane MI is at a position from the 28-th surface toward the image by 0.795 [mm].

TABLE 4

[General Data]

$\beta = 40\text{times}$
$f = -7.605$
NA = 1.40          WD = 0.305
f1 = −5.175        f2 = 14.366
r1 = 1.816         r2 = −1.540
D1 = 8.908         D2 = 15.701
L1 = 32.308        TL = 64.695
TLT = 65.000

[Lens Data]

| Surface Number | R | D | Dm | nd | νd |
|---|---|---|---|---|---|
| 1 | ∞ | 0.100 | 0.630 | (Variable) | (Variable) |
| 2 | ∞ | 0.170 | 1.083 | 1.524 | 54.24 |
| 3 | ∞ | 0.035 | 1.764 | (Variable) | (Variable) |
| 4 | ∞ | 0.400 | 1.915 | 1.540 | 59.46 |
| 5 | −1.370 | 1.685 | 1.928 | 2.001 | 29.12 |
| 6 | −2.009 | 0.100 | 3.881 | | |
| 7 | −6.234 | 1.043 | 5.576 | 1.849 | 43.79 |
| 8 | −3.927 | 0.100 | 6.014 | | |
| 9 | 22.288 | 1.354 | 7.657 | 1.498 | 82.57 |
| 10 | −10.860 | 0.100 | 7.790 | | |
| 11 | −29.342 | 0.500 | 7.947 | 1.720 | 34.71 |
| 12 | 9.524 | 2.936 | 8.439 | 1.434 | 95.16 |
| 13 | −6.444 | 0.100 | 8.613 | | |
| 14 | 20.841 | 0.500 | 8.908 | 1.917 | 31.60 |
| 15 | 9.318 | 2.280 | 8.766 | 1.498 | 82.57 |
| 16 | −11.404 | 0.100 | 8.807 | | |
| 17 | −211.242 | 0.500 | 8.603 | 1.553 | 55.07 |
| 18 | 6.424 | 2.098 | 8.343 | 1.456 | 91.37 |
| 19 | −33.630 | (D19) | 8.336 | | |
| 20 | 15.877 | 0.500 | 8.200 | 1.553 | 55.07 |
| 21 | 5.172 | 2.092 | 7.772 | 1.456 | 91.37 |
| 22 | −227.278 | 0.543 | 7.734 | | |
| 23 | 6.859 | 1.666 | 7.402 | 1.808 | 22.74 |
| 24 | 5.415 | (D24) | 6.403 | | |
| 25 | 5.417 | 1.651 | 6.659 | 1.623 | 57.10 |
| 26 | −25.671 | 0.100 | 6.495 | | |
| 27 | 3.689 | 2.637 | 4.965 | 2.001 | 29.12 |
| 28 | 1.816 | 0.920 | 2.009 | | |
| 29 | −1.840 | 0.500 | 1.790 | 1.959 | 17.47 |
| 30 | −62.717 | 0.239 | 2.084 | | |
| 31 | −4.709 | 0.746 | 2.338 | 1.883 | 40.69 |
| 32 | −1.912 | 0.471 | 2.762 | | |
| 33 | −1.540 | 1.735 | 2.854 | 1.456 | 91.37 |
| 34 | −2.404 | (D34) | 4.575 | | |
| 35 | 13.919 | 1.180 | 6.810 | 1.456 | 91.37 |
| 36 | −13.262 | 0.100 | 6.900 | | |
| 37 | 6.555 | 1.116 | 7.221 | 1.595 | 67.73 |
| 38 | 23.790 | 3.499 | 7.113 | | |
| 39 | −192.253 | 0.500 | 5.885 | 1.917 | 31.60 |
| 40 | 4.878 | 0.694 | 5.664 | 1.847 | 23.80 |
| 41 | 7.995 | (D41) | 5.631 | | |
| 42 | −4.625 | 3.000 | 6.242 | 1.855 | 24.80 |
| 43 | 281.721 | 2.603 | 10.608 | 1.498 | 82.57 |
| 44 | −7.869 | 0.100 | 11.024 | | |
| 45 | 25.144 | 0.501 | 15.040 | 1.859 | 22.73 |
| 46 | 12.618 | 5.194 | 15.448 | 1.664 | 27.35 |
| 47 | −14.594 | 0.100 | 15.582 | | |
| 48 | 457.933 | 0.500 | 15.439 | 1.731 | 40.51 |
| 49 | 12.625 | 5.154 | 15.575 | 1.434 | 95.16 |
| 50 | −15.312 | 10.000 | 15.701 | | |

[Variable Distance Data]

| immersion liquid | Oil | Silicone Oil |
|---|---|---|
| ndim | 1.51 | 1.40 |
| νdim | 41.33 | 51.96 |
| D19 | 0.500 | 6.639 |
| D24 | 8.824 | 2.685 |
| D34 | 1.545 | 0.500 |
| D41 | 1.991 | 3.036 |

Figure 13:
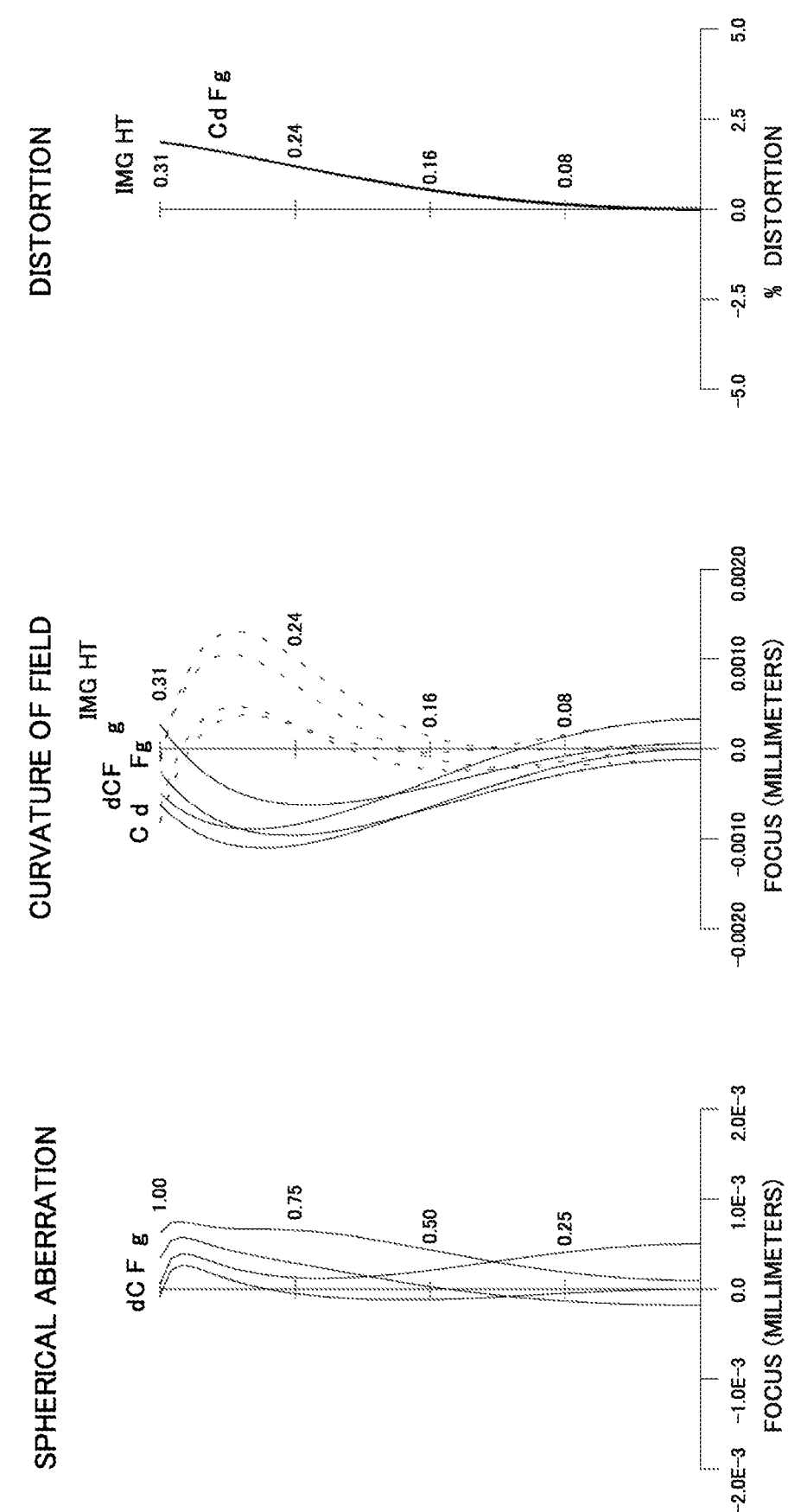
FIG. 13 shows various aberration graphs of the microscope objective lens according to Fourth Example in a case where the refractive index of immersion liquid is 1.51.
Figure 14:
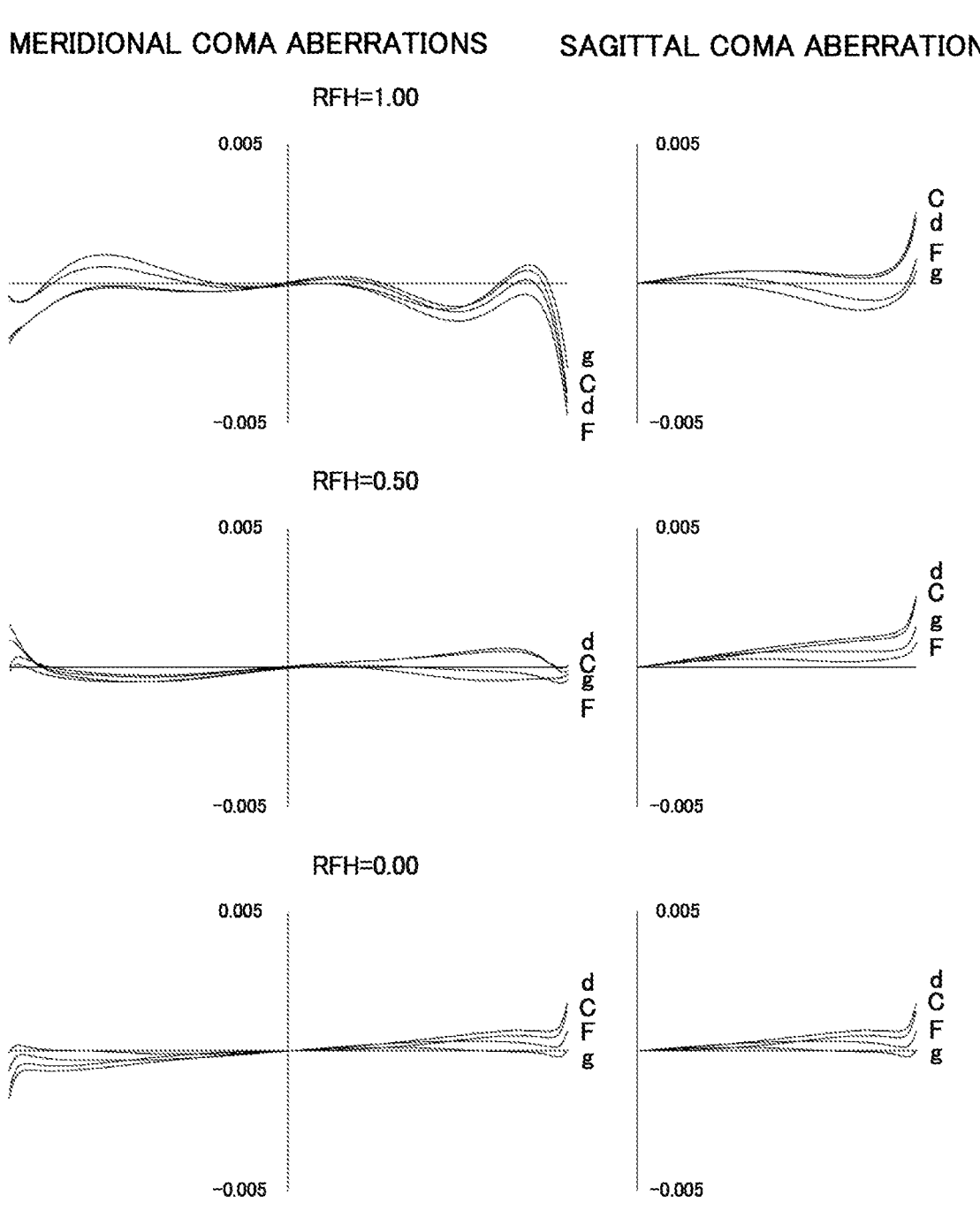
FIG. 14 shows coma aberration graphs of the microscope objective lens according to Fourth Example in the case where the refractive index of immersion liquid is 1.51.
Figure 15:
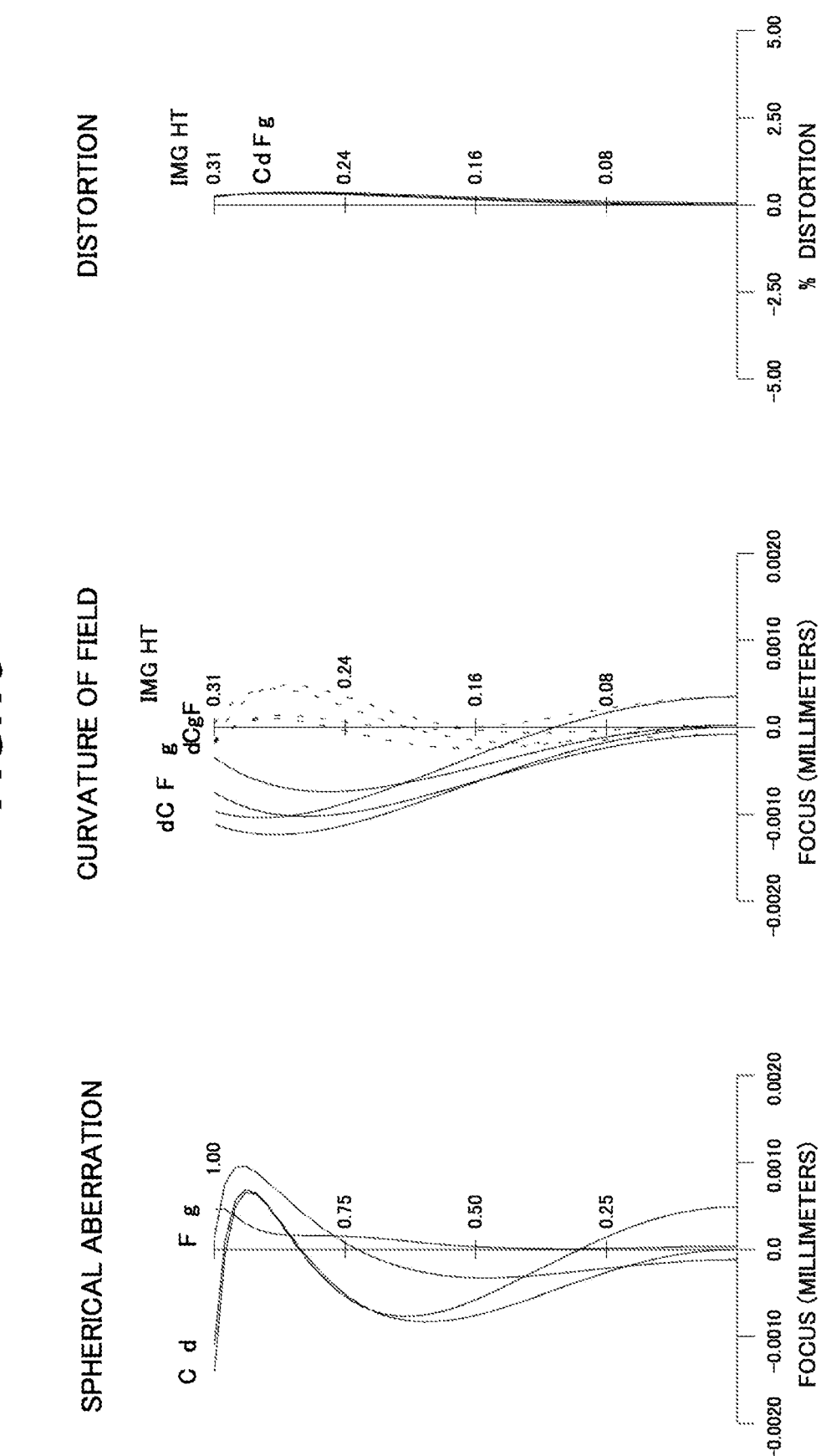
FIG. 15 shows various aberration graphs of the microscope objective lens according to Fourth Example in a case where the refractive index of immersion liquid is 1.40.
Figure 16:
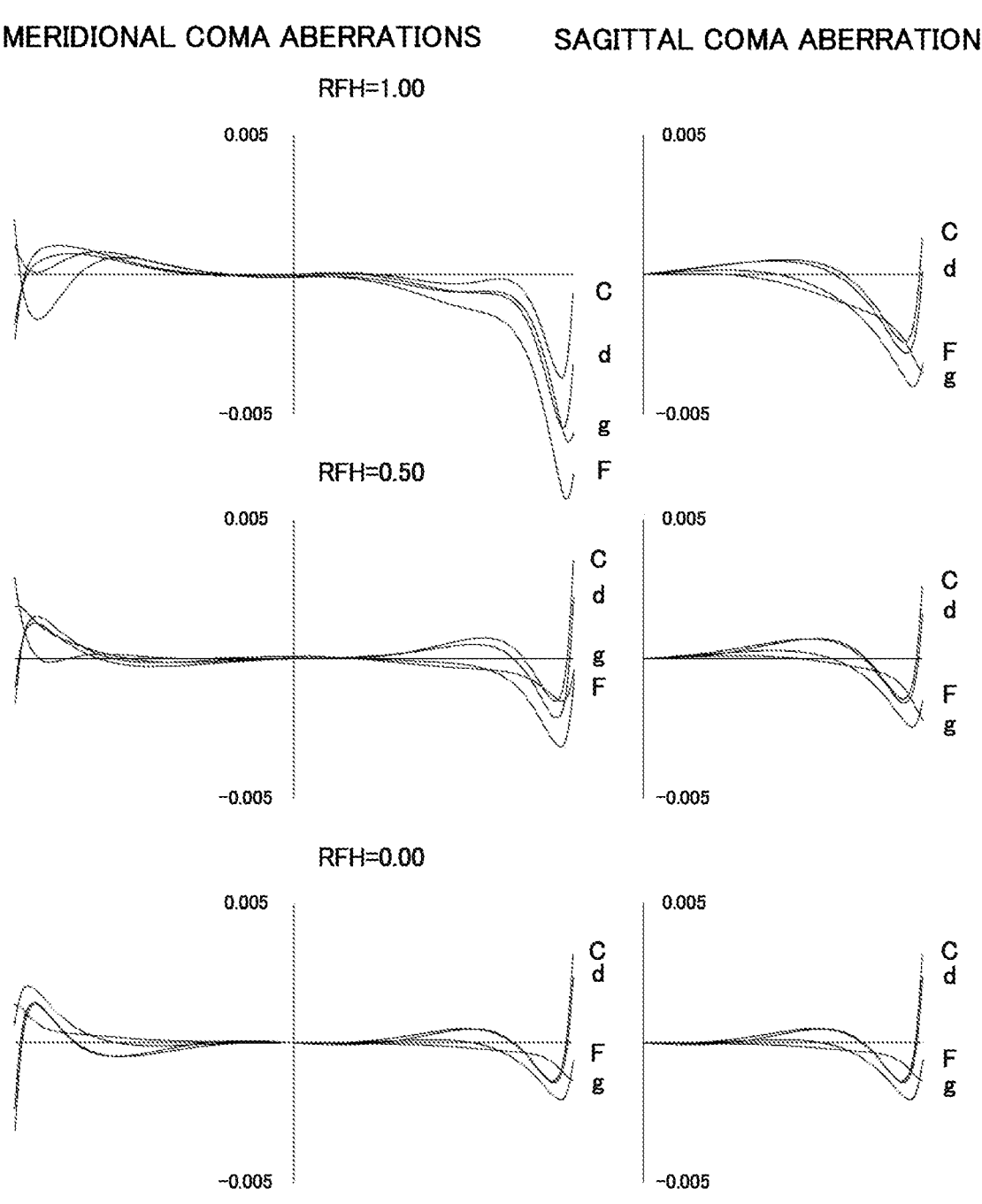
FIG. 16 shows coma aberration graphs of the microscope objective lens according to Fourth Example in the case where the refractive index of immersion liquid is 1.40.

FIG. 13 shows various aberrations (the spherical aberration, curvature of field, and distortion) of the microscope objective lens in a case where the refractive index ndim of the immersion liquid for d-line is 1.51 according to Fourth Example. FIG. 14 shows coma aberrations (meridional and sagittal coma aberrations) of the microscope objective lens in a case where the refractive index ndim of the immersion liquid for d-line is 1.51 according to Fourth Example. FIG. 15 shows various aberrations (the spherical aberration, curvature of field, and distortion) of the microscope objective lens in a case where the refractive index ndim of the immersion liquid for d-line is 1.40 according to Fourth Example. FIG. 16 shows coma aberrations (meridional and sagittal coma aberrations) of the microscope objective lens in a case where the refractive index ndim of the immersion liquid for d-line is 1.40 according to Fourth Example. Each aberration graph shows that even in cases where the types of immersion liquid (refractive index) vary, the microscope objective lens according to Fourth Example has various aberrations favorably corrected even with a small diameter, and has an excellent imaging performance.

Next, the table of [Conditional Expression Corresponding Value] is shown below. This table collectively indicates values corresponding to the conditional expressions (1) to (8) with respect to all the Examples (First to Fourth Examples).

$-0.2 < f \times NA/TL < -0.05$     Conditional Expression(1)

$0.1 < WD/r1 < 2.0$     Conditional Expression(2)

$0.35 < L1/TL < 0.7$     Conditional Expression(3)

$0.12 < D1/TL < 0.3$     Conditional Expression(4)

$\nu dif > 50$     Conditional Expression(5)

$0.01 < r1/(-f) < 1.0$     Conditional Expression(6)

$0.01 < r2/f < 1.0$     Conditional Expression(7)

$0.2 < D1/D2 < 2.0$     Conditional Expression(8)

| [Conditional Expression Corresponding Value] | | | | |
|---|---|---|---|---|
| Conditional Expression | First Example | Second Example | Third Example | Fourth Example |
| (1) | −0.165 | −0.068 | −0.161 | −0.165 |
| (2) | 0.225 | 0.190 | 1.746 | 0.168 |
| (3) | 0.528 | 0.695 | 0.466 | 0.499 |
| (4) | 0.166 | 0.159 | 0.242 | 0.138 |
| (5) | 62.90 | 60.45 | 62.92 | 60.45 |
| (6) | 0.178 | 0.528 | 0.019 | 0.239 |
| (7) | 0.191 | 0.347 | 0.021 | 0.203 |
| (8) | 0.748 | 1.682 | 0.753 | 0.567 |

According to each Example described above, the microscope objective lens capable of favorably correcting the aberrations even with a small diameter can be achieved.

Each of the aforementioned Examples describes a specific example of this embodiment. This embodiment is not limited to the example.

The microscope objective lens OL according to this embodiment has the configuration where the intermediate imaging plane MI on which the light from the object is imaged is formed between the first lens group G1 and the second lens group G2 or in the most image-side lens of the first lens group G1. In view of lens group configuration, it can be construed to comprise an intermediate lens group that includes the intermediate imaging plane MI as described below. That is, a configuration can be adopted where the microscope objective lens comprises the intermediate lens group that is arranged between the most object-side positive lens group and the most image-side lens, and the intermediate imaging plane on which the light from the object is imaged is formed in the intermediate lens group. Here, a configuration can be adopted where the air distance between the most object-side positive lens group and the intermediate lens group, and the air distance between the most image-side lens group and the intermediate lens group are the maximum air distance or the second maximum air distance in the entire microscope objective lens.

Specifically, in the microscope objective lens according to First Example described above (see FIG. 3), the air distance between the cemented lens CL14 (positive lens L109) and the cemented lens CL15 (positive lens L110) is the second maximum air distance in the entire microscope objective lens, and serves as the air distance between the object-side lens group and the intermediate lens group. The air distance between the positive meniscus lens L204 and the cemented lens CL21 (negative lens L205) is the maximum air distance in the entire microscope objective lens, and serves as the air distance between the intermediate lens group and the image-side lens group. In the microscope objective lens according to Second Example described above (see FIG. 6), the air distance between the cemented lens CL15 (negative lens L111) and the positive meniscus lens L112 is the maximum air distance in the entire microscope objective lens, and serves as the air distance between the object-side lens group and the intermediate lens group. The air distance between the positive meniscus lens L202 and the cemented lens CL21 (negative lens L203) is the second maximum air distance in the entire microscope objective lens, and serves as the air distance between the intermediate lens group and the image-side lens group. In the microscope objective lens according to Third Example described above (see FIG. 9), the air distance between the positive meniscus lens L103 and the positive lens L104 serves as the air distance between the object-side lens group and the intermediate lens group, and the air distance between the positive meniscus lens L202 and the cemented lens CL21 (negative meniscus lens L203) serves as the air distance between the intermediate lens group and the image-side lens group. In the microscope objective lens according to Fourth Example described above (see FIG. 12), the air distance between the negative meniscus lens L113 and the positive lens L114 serves as the air distance between the object-side lens group and the intermediate lens group, and the air distance between the positive meniscus lens L205 and the cemented lens CL21 (negative lens L206) serves as the air distance between the intermediate lens group and the image-side lens group. These are evident from the optical path diagrams showing the configurations of the microscope objective lenses according to Examples, and the tables showing the data items in Examples.

EXPLANATION OF NUMERALS AND CHARACTERS

| | |
|---|---|
| G1 First lens group | G2 Second lens group |

The invention claimed is:

1. An infinity-corrected microscope objective lens converting light from an object into parallel light, comprising, in order from the object on an optical axis: a first lens group having a positive refractive power; and a second lens group having a positive refractive power, wherein an intermediate imaging plane on which an image is formed with the light from the object is formed between the first lens group and the second lens group or in a lens closest to an image in the first lens group, wherein the first lens group includes at least one lens having a concave-shaped lens surface facing the intermediate imaging plane, and the following conditional expression is satisfied, $$-0.2 < f \times NA/TL < -0.05$$

$$0.1 < WD/r1 < 2.0$$

where f: a focal length of the microscope objective lens,

NA: an object-side numerical aperture of the microscope objective lens,

TL: a distance on the optical axis from a most object-side lens surface of the microscope objective lens to a most image-side lens surface of the microscope objective lens WD: a distance on the optical axis from an object surface to the most object-side lens surface of the microscope objective lens, and r1: a radius of curvature of a concave-shaped lens surface of a lens having a smallest radius of curvature of the concave-shaped lens surface, among the at least one lens of the first lens group.

2. The microscope objective lens according to claim 1, wherein the following conditional expression is satisfied, $$0.35 < L1/TL < 0.7$$

where L1: a length of the first lens group on the optical axis.

3. The microscope objective lens according to claim 1, wherein the following conditional expression is satisfied, $$0.12 < D1/TL < 0.3$$

where D1: a maximum outer diameter of the first lens group.

4. The microscope objective lens according to claim 1, further comprising at least one cemented lens arranged in at least one of the first lens group and the second lens group, wherein the following conditional expression is satisfied, $$vdif > 50$$

where vdif: a maximum value of a difference of Abbe numbers of lenses constituting the at least one cemented lens, in the cemented lens.

5. The microscope objective lens according to claim 1, wherein the second lens group includes at least one lens having a concave-shaped lens surface facing the intermediate imaging plane, and the following conditional expressions are satisfied, $$0.01 < r1/(-f) < 1.0, \text{ and}$$

$$0.01 < r2/f < 1.0$$

where r2: a radius of curvature of a concave-shaped lens surface of a lens having a smallest radius of curvature of the concave-shaped lens surface, among the at least one lens of the second lens group.

6. The microscope objective lens according to claim 1, wherein the following conditional expression is satisfied, $$0.2 < D1/D2 < 2.0$$

where D1: a maximum outer diameter of the first lens group, and

D2: a maximum outer diameter of the second lens group.

7. The microscope objective lens according to claim 1, wherein the first lens group includes a meniscus lens that is arranged closest to the image in the first lens group and has a concave surface facing the image, the second lens group includes a meniscus lens that is arranged closest to the object in the second lens group and has a concave surface facing the object, and the intermediate imaging plane is formed between an image-side concave surface of the meniscus lens of the first lens group and an object-side concave surface of the meniscus lens of the second lens group that are arranged to face each other with an air distance intervening between the surfaces.

8. The microscope objective lens according to claim 1, wherein the first lens group includes a positive lens arranged closest to the image in the first lens group, the second lens group includes a meniscus lens that is arranged closest to the object in the second lens group and has a concave surface facing the object, and the intermediate imaging plane is formed between the positive lens of the first lens group and the meniscus lens of the second lens group that are arranged with an air distance intervening between the lenses.

9. The microscope objective lens according to claim 1, wherein the first lens group includes a meniscus lens that is arranged closest to the image in the first lens group and has a convex surface facing the object, the second lens group includes a meniscus lens that is arranged closest to the object in the second lens group and has a convex surface facing the image, and the intermediate imaging plane is formed in any one of the meniscus lens of the first lens group and the meniscus lens of the second lens group.

10. A microscope apparatus that comprises an infinity-corrected first microscope objective lens converting light from an object into parallel light, and an infinity-corrected second microscope objective lens converting light from the object into parallel light, and is capable of selecting and using the first microscope objective lens or the second microscope objective lens, wherein at least one of the first microscope objective lens and the second microscope objective lens is the microscope objective lens according to claim 1.

* * * * *